United States Patent
Yamada et al.

(10) Patent No.: US 11,481,919 B2
(45) Date of Patent: Oct. 25, 2022

(54) INFORMATION PROCESSING DEVICE

(71) Applicants: AISIN CORPORATION, Kariya (JP); KYUSHU INSTITUTE OF TECHNOLOGY, Kitakyushu (JP)

(72) Inventors: Hideo Yamada, Tokyo (JP); Ryuya Muramatsu, Tokyo (JP); Masatoshi Shibata, Tokyo (JP); Hakaru Tamukoh, Kitakyushu (JP); Shuichi Enokida, Iizuka (JP); Yuta Yamasaki, Kitakyushu (JP)

(73) Assignees: AISIN CORPORATION, Kariya (JP); KYUSHU INSTITUTE OF TECHNOLOGY, Kitakyushu (JP)

( * ) Notice: Subject to any disclaimer, the term of this patent is extended or adjusted under 35 U.S.C. 154(b) by 0 days.

(21) Appl. No.: 16/649,830

(22) PCT Filed: Sep. 26, 2018

(86) PCT No.: PCT/JP2018/035607
§ 371 (c)(1),
(2) Date: Mar. 23, 2020

(87) PCT Pub. No.: WO2019/065702
PCT Pub. Date: Apr. 4, 2019

(65) Prior Publication Data
US 2020/0286254 A1     Sep. 10, 2020

(30) Foreign Application Priority Data
Sep. 26, 2017   (JP) .............................. JP2017-185476

(51) Int. Cl.
*G06T 7/73* (2017.01)
*G06V 10/60* (2022.01)

(52) U.S. Cl.
CPC ................ *G06T 7/73* (2017.01); *G06V 10/60* (2022.01); *G06T 2207/20084* (2013.01)

(58) Field of Classification Search
CPC ... G06T 7/00; G06T 7/73; G06T 2207/20084; G06K 9/6271; G06N 3/08; G06N 3/0481;
(Continued)

(56) References Cited

U.S. PATENT DOCUMENTS

2012/0051638 A1    3/2012  Kawai et al.
2016/0098606 A1*   4/2016  Nakamura ......... G06K 9/00805
                                                        382/103
2016/0155049 A1    6/2016  Choi

FOREIGN PATENT DOCUMENTS

JP    2015-014819 A    1/2015
WO    2017/023551 A2   2/2017

OTHER PUBLICATIONS

Akedo, Yu, Hidehiro Nakano, and Arata Miyauchi. "A Learning Algorithm of Binary Neural Networks Based on Real-Coded GA." NOLTA'08, Budapest, Hungary, Sep. 2008. (Year: 2008).*
(Continued)

*Primary Examiner* — Vu Le
*Assistant Examiner* — Tracy Mangialaschi
(74) *Attorney, Agent, or Firm* — Oliff PLC

(57) ABSTRACT

An image recognition device includes: an image processing device that acquires a feature amount from an image; and an identification device that determines whether a prescribed identification object is present in the image, and identifies the identification object. The identification device includes a BNN that has learned the identification object in advance, and performs identification processing by performing a binary calculation with the BNN on the feature amount acquired by the image processing device. Then, the identification device selects a portion effective for identification from among high-dimensional feature amounts output by the
(Continued)

image processing device to reduce the dimensions used in identification processing, and copies low-dimensional feature amounts output by the image processing device to increase dimensions.

13 Claims, 24 Drawing Sheets

(58) Field of Classification Search
CPC ........ G06N 3/063; G06V 10/60; G06V 10/50; G06V 40/10
See application file for complete search history.

(56) References Cited

OTHER PUBLICATIONS

Courbariaux, Matthieu, et al. "Binarized neural networks: Training deep neural networks with weights and activations constrained to +1 or-1." arXiv preprint arXiv:1602.02830 (2016). (Year: 2016).*
Hiromoto, Masayuki, Hiroki Sugano, and Ryusuke Miyamoto. "Partially parallel architecture for adaboost-based detection with haar-like features." IEEE Transactions on Circuits and Systems for Video Technology 19.1 (2008): 41-52. (Year: 2008).*
Watanabe, Tomoki, Satoshi Ito, and Kentaro Yokoi. "Co-occurrence histograms of oriented gradients for pedestrian detection." Pacific-Rim Symposium on Image and Video Technology. Springer, Berlin, Heidelberg, 2009. (Year: 2009).*
Kamemaru, Shun-ichi, Shigeru Yamaguchi, and Jun-ichi Yano. "Fabrication of a biological visual perception system using a microlens array in a hybrid pattern recognition system." Japanese journal of applied physics 31.5S (1992): 1682. (Year: 1992).*
Kung J, Zhang D, Van der Wal G, Chai S, Mukhopadhyay S. Efficient object detection using embedded binarized neural networks. Journal of Signal Processing Systems. Jun. 2017;90(6):877-90. (Year: 2017).*
Redkar, Shrutika. Deep Learning Binary Neural Network on an FPGA. (Doctoral dissertation, Worcester Polytechnic Institute, May 2017). (Year: 2017).*
Guan T, Zeng X, Seok M. Recursive binary neural network learning model with 2.28 b/weight storage requirement. arXiv preprint arXiv:1709.05306. Sep. 15, 2017. (Year: 2017).*
Almero, Vincent Jan, et al. "An aquaculture-based binary classifier for fish detection using multilayer artificial neural network." 2019 IEEE 11th International Conference on Humanoid, Nanotechnology, Information Technology, Communication and Control, Environment, and Management (HNICEM). IEEE, 2019. (Year: 2019).*
Watanabe et al.; "Co-occurrence Histograms of Oriented Gradients for Human Detection;" IPSJ Transactions on Computer Vision and Applications; 2010; pp. 39-47; vol. 2.
Dalal et al.; "Histograms of Oriented Gradients for Human Detection;" IEEE Computer Society Conference on Computer Vision & Pattern Recognition; 2005; pp. 886-893; vol. 1.
Akedo et al.; "A Learning Algorithm of Binary Neural Networks Based on Real-Coded GA;" IEICE Technical Report; 2008; vol. 108, No. 101.
Courbariaux et al.; BinaryConnect: Training Deep Neural Networks with binary weights during propagations; [Online]; 2016; URL <https://arxiv.org/abs/1511.00363>.
Courbariaux et al.; Binarized Neural Networks: Training Neural Networks with Weights and Activations Constrained to +1 or -1; [Online]; 2016; URL <https://arxiv.org/abs/1602.02830>.
Yamaguchi et al.; Fundamental description of a hybrid pattern recognition system using microlens array; [Online]; 1991; URL <https://core.ac.uk/download/pdf/59187112.pdf>.
Nov. 27, 2018 Search Report issued in International Patent Application No. PCT/JP2018/035608.
Nov. 27, 2018 Search Report issued in International Patent Application No. PCT/JP2018/035607.
Mar. 31, 2020 International Preliminary Report on Patentability issued in International Patent Application No. PCT/JP2018/035608.
Mar. 31, 2020 International Preliminary Report on Patentability issued in International Patent Application No. PCT/JP2018/035607.
U.S. Appl. No. 16/649,751, filed Mar. 23, 2020 in the name of Hideo Yamada et al.
Apr. 1, 2021 Extended Search Report issued in European Patent Application No. 18862940.6.
Rastegari et al; "XNOR-Net: ImageNet Classification Using Binary Convolutional Neural Networks;" CYRPTO 2018; pp. 1-17; Aug. 2, 2016.
Ali et al; "Boosted NNE collections for multicultural facial expression recognition;" Pattern Recognition, vol. 55; pp. 14-27; Feb. 6, 2016.
Kung et al; "Efficient Object Detection Using Embedded Binarized Neural Networks;" Journal of Signal Processing Systems; vol. 90; No. 6; pp. 877-890; Jun. 8, 2017.
Nov. 9, 2020 Office Action issued in Japanese Patent Application No. 2017-185476.
Nov. 9, 2020 Office Action issued in Japanese Patent Application No. 2017-185477.
May 19, 2021 Extended Search Report issued in European Patent Application No. 18861998.5.
Aoki et al; "Human Tracking Method based on Improved HOG+Real AdaBoost;" 2015 10th Asian Control Conference (ASCC) IEEE; pp. 1-6; May 31, 2015.
Jun. 18, 2021 Office Action issued in Japanese Patent Application No. 2017-185476.
May 4, 2022 Office Action Issued In U.S. Appl. No. 16/649,751.

\* cited by examiner

IDENTIFICATION ACCURACY BY REDUCING INTERMEDIATE LAYER

| IDENTIFICATION INSTRUMENT | THE NUMBER OF UNITS | IDENTIFICATION ACCURACY (%) |
|---|---|---|
| Real AdaBoost | — | 97.59 |
| IDENTIFICATION DEVICE (WITHOUT SELECTION) INPUT DIMENSIONS 32592 | 1024 | 98.32 |
| | 256 | 98.29 |
| | 64 | 98.41 |
| | 16 | 98.31 |
| | 4 | 98.26 |
| | 2 | 98.12 |
| | 1 | 98.29 |

FIG.7

IDENTIFICATION ACCURACY BY REDUCING INPUT LAYER
AND INTERMEDIATE LAYER

| IDENTIFICATION INSTRUMENT | THE NUMBER OF UNITS | IDENTIFICATION ACCURACY (%) |
|---|---|---|
| Real AdaBoost | — | 97.59 |
| IDENTIFICATION DEVICE (WITH SELECTION) INPUT DIMENSIONS 500 | 1024 | 98.37 |
| | 256 | 98.37 |
| | 64 | 97.97 |
| | 16 | 97.74 |
| | 4 | 97.39 |
| | 2 | 97.39 |
| | 1 | 97.05 |

FIG.8

IDENTIFICATION ACCURACY BY REDUCING INPUT LAYER,
IN CASES WHERE THE NUMBER OF INTERMEDIATE UNITS IS ONE

| IDENTIFICATION INSTRUMENT | INPUT DIMENSIONS | THE NUMBER OF INTERMEDIATE UNITS | IDENTIFICATION ACCURACY (%) |
|---|---|---|---|
| IDENTIFICATION DEVICE | 500 | 1 | 97.13 |
| | 200 | 1 | 95.79 |
| | 100 | 1 | 94.52 |
| | 64 | 1 | 93.30 |
| | 32 | 1 | 91.79 |
| | 16 | 1 | 90.03 |
| | 8 | 1 | 88.57 |
| | 4 | 1 | 83.96 |

FIG.9

CIRCUIT SCALE

|  | Real AdaBoost | IDENTIFICATION DEVICE (THE NUMBER OF INTERMEDIATE UNITS IS ONE) |
| --- | --- | --- |
| Resister | 137 Resisters | 16 Resisters |
| LUTs | 1226 LUTs | 8 LUTs |
| DSP | 20 DSPs | 0 |
| Block RAM | 2 Block RAMs | 0 |

FIG.10

REQUIRED MEMORY CAPACITY

| Real AdaBoost | IDENTIFICATION DEVICE (THE NUMBER OF INTERMEDIATE UNITS IS ONE) |
| --- | --- |
| 1024 kbit | 0.5 kbit |

FIG.12
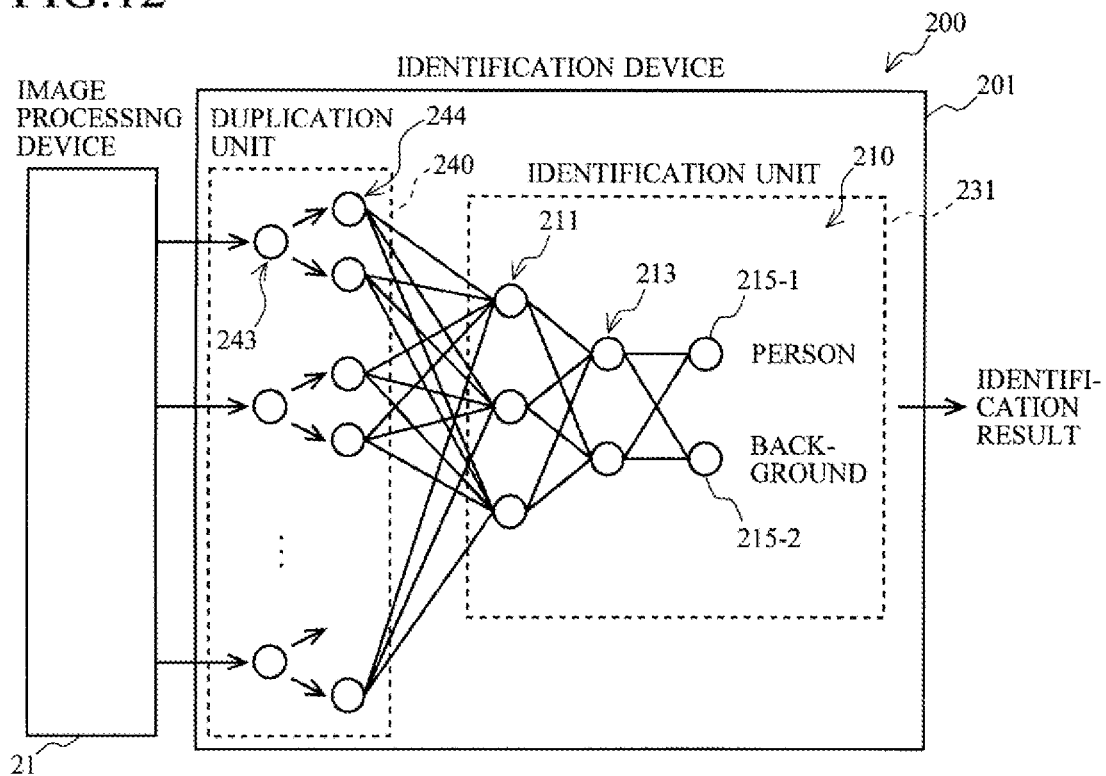
FIG.13
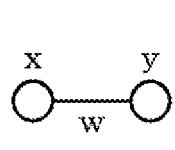
WEIGHT $w = \{-1, 1\}$
$x \cdot w = \{-x, x\}$
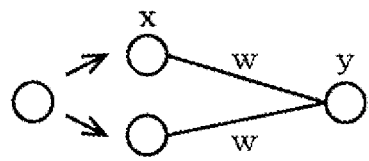
WEIGHT $w = \{-1, 1\}$
$\sum x \cdot w = \{-2x, 0, 2x\}$

FIG.14

IDENTIFICATION ACCURACY BY DUPLICATION

| THE NUMBER OF INPUTS | THE NUMBER OF DUPLICATIONS | IDENTIFICATION ACCURACY (%) |
|---|---|---|
| 100 | ORIGINAL | 94.52 |
| (200) | ×2 | 95.56 |
| (300) | ×3 | 95.81 |
| (400) | ×4 | 96.18 |
| (500) | ×5 | 96.09 |
|  |  |  |
| 500 | ORIGINAL | 97.13 |

HOG FEATURE AMOUNT

CoHOG FEATURE AMOUNT

MRCoHOG FEATURE AMOUNT

FIG.21(a)

$$m(x, y) = \sqrt{f_x(x, y)^2 + f_y(x, y)^2} \quad \cdots (1)$$

$$m(x, y) = |f_x(x, y)| + |f_y(x, y)| \quad \cdots (2)$$

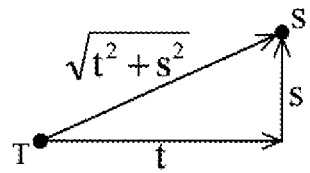

FIG.21(b)

$$\theta(x, y) = \tan^{-1} \frac{f_y(x, y)}{f_x(x, y)} \quad \cdots (3)$$

|  | a | b | c | d |
|---|---|---|---|---|
| $f_x(x, y)$ | POSITIVE | NEGATIVE | POSITIVE | NEGATIVE |
| $f_y(x, y)$ | POSITIVE | NEGATIVE | NEGATIVE | POSITIVE |
| $\dfrac{f_y(x, y)}{f_x(x, y)}$ | POSITIVE | POSITIVE | NEGATIVE | NEGATIVE |

$$a \to (x, y) = \begin{cases} 0° & : y \leq x \\ 45° & : y > x \end{cases}$$

$$b \to (x, y) = \begin{cases} 90° & : -y \leq x \\ 135° & : -y > x \end{cases}$$

$$c \to (x, y) = \begin{cases} 180° & : y \geq x \\ 225° & : y < x \end{cases}$$

$$d \to (x, y) = \begin{cases} 270° & : -y \geq x \\ 315° & : -y < x \end{cases}$$

FIG.21(c)

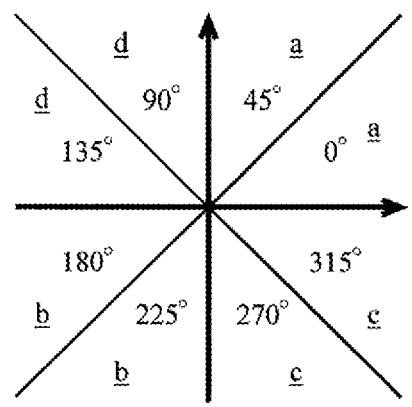

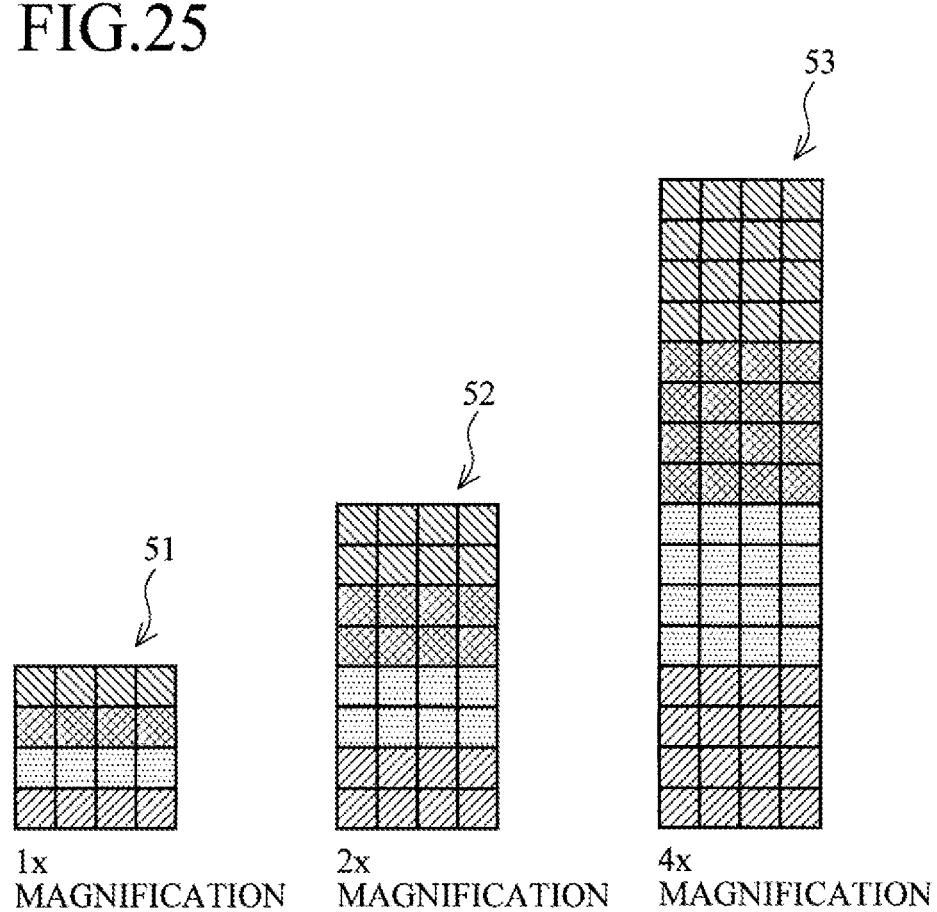

INFORMATION PROCESSING DEVICE

TECHNICAL FIELD

The present invention relates to an information processing device, and for example, relates to which identifies the learned subject.

BACKGROUND ART

In recent years, technologies for recognizing a specific object from an image captured by a camera and identifying the specific object have been rapidly developed, and have been used various fields such as, for example, driving support of vehicles, diagnosis support of medical treatment.

In these image recognition technologies, a feature amount is extracted from image data by a certain method, and is compared with a feature amount of an identification object (e.g., a person) to determine whether or not the identification object is present in the aforementioned image data.

The technologies for performing such image recognition include technologies disclosed in Non-Patent Literature 1 and Non-Patent Literature 2.

Such technologies are to detect an identification object by extracting a feature amount called a HOG feature amount from an image and being compared with the HOG feature amount which is learned from the image in which the identification object is captured in advance.

In addition, there are a CoHOG feature amount having more robustness than the HOG feature amount, a MRCo-HOG feature amount having further more robustness, and the like, in the technologies of extracting the feature amount from the image.

By the way, since such image recognition technologies use high-dimensional feature amounts, when being implemented in hardware, a circuit becomes complicated and large-scale. Therefore, it has been a problem how to reduce a processing cost and realize the circuit with small resources.

If this image recognition technologies can be implemented on semiconductor chips, it is expected to be used in various situations, e.g., used in mobile devices such as vehicles and airplanes, or used in mobile terminals and wearable terminals, and used in various situations.

On the other hand, there has been rapidly developed a technology of making a neural network to learn an object, recognizing the object by input data using the learned result (neural network) thereof to identify the recognized object.

However, although the learning is performed by a back propagation or the like using a teacher signal in the neural network, there is a problem that an enormous amount of calculation is required for this learning processing, and an enormous amount of calculation is further required if the number of input data (number of dimensions of feature amount) increases.

Also, when the neural network is implemented in hardware, the increase in the number of input data causes a problem in that a circuit becomes complicated and large-scale.

CITATION LIST

Non-Patent Literature

Non-Patent Literature 1: Tomoki Watanabe, Satoshi Ito etc.; "Co-occurrence Histograms of Oriented Gradients for Human Detection", IPSJ Transactions on Computer Vision and Applications, Vol. 2 pp. 39-47, 2010

Non-Patent Literature 2: Navneet Dalal, Bill Triggs.: "Histgrams of Oriented Gradients for Human Detection", IEEE Computer Society Conference on Computer Vision & Pattern Recognition, Vol. 1 pp. 886-893, 2005

DISCLOSURE OF INVENTION

Problem to be Solved by the Invention

The object of the present invention is to reduce a processing cost.

SUMMARY OF THE INVENTION(S)

(1) The invention described in claim 1 provides an information processing device comprising: a feature amount acquiring means configured to acquire a feature amount of identification object data; a selection means configured to select a feature amount of a portion, used for identification, specified in advance from the feature amount acquired by the feature amount acquiring means; an identification means configured to have learned an identification object using multiple-valued weighting; an input means configured to input the feature amount of the portion selected by the selection means into the identification means; and an output means configured to output an identification result of being identified by the identification means using the feature amount of the portion input by the input means.

(2) The invention described in claim 2 provides the information processing device according to claim 1, wherein in the identification means, the learning of the identification object is conducted by binarized weighting.

(3) The invention described in claim 3 provides the information processing device according to claim 1 or 2, wherein the selection means selects a feature amount of a portion specified by an identification algorithms, such as RAdB, in advance, from the feature amount acquired by the feature amount acquiring means.

(4) The invention described in claim 4 provides the information processing device according to claim 3, wherein the selection means selects a feature amount of a portion, in which identification accuracy by the identification means becomes high, specified by the identification algorithm in advance, from the feature amount acquired by the feature amount acquiring means.

(5) The invention described in claim 5 provides the information processing device according to claim 3, wherein the feature amount acquiring means acquires a feature amount based on distribution of co-occurrence of a luminance gradient extracted by the feature amount extraction means from the image data which is identification object data, and the selection means selects a feature amount of a portion in which extraction processing or an extraction circuit configuration by the feature amount extraction means is simplified, specified by the identification algorithm in advance, from the feature amount acquired by the feature amount acquiring means.

(6) The invention described in claim 6 provides the information processing device according to any one of claims 1 to 5, wherein the identification means is a binary neural network.

(7) The invention described in claim 7 provides the information processing device according to claim 6, wherein the binary neural network is composed using an adder for binarizing and adding the feature amount of the portion, and a counter for calculating an output of the adder.

(8) The invention described in claim 8 provides the information processing device according to any one of claims 1 to 6, further comprising a duplication means configured to duplicate the feature amount of the portion selected by the selection means, wherein the input means inputs into the identification means the feature amount of the portion selected by the selection means and the feature amount of the portion duplicated by the duplication means.

Effect of the Invention(s)

The present invention can reduce the processing cost by selecting the feature amount used for the identification.

BRIEF DESCRIPTION OF DRAWINGS

FIG. 7 is a drawing showing an experimental result.
FIG. 8 is a drawing showing an experimental result.
FIG. 9 shows a table comparing circuit scales.
FIG. 10 shows a table comparing a capacity of a memory.
FIG. 12 is a drawing for describing an identification device.
FIG. 13 is a drawing for considering an improvement in identification accuracy by duplicating a feature amount.
FIG. 14 is a drawing showing an experimental result.
FIG. 21 are drawings for describing a calculation method.
FIG. 24 are drawings for describing an operation of a gradient direction calculation unit and the like.
FIG. 25 is a drawing for describing data extension processing in a vertical direction.
FIG. 26 is a drawing for describing data extension processing in a horizontal direction.

BEST MODE(S) FOR CARRYING OUT THE INVENTION (1) Outline of Embodiments

The image recognition device 200 (FIG. 1) includes an image processing device 21 configured to acquire a feature amount from an image captured by a camera 84, and an identification device 201 configured to determine whether a predetermined identification object is present in the image using the acquired feature amount to identify this identification object.

The image processing device 21 acquires various feature amounts, such as a HOG feature amount, a CoHOG feature amount, a MRCoHOG feature amount, and a Haar-like feature amount, from the image as the feature amount.

The identification device 201 includes a binary neural network (BNN) that has learned the identification object in advance, and performs an identification processing by performing a binary calculation with the BNN on the feature amount acquired by the image processing device 21. The learning of the identification object by the BNN is performed by optimizing weighting of a network by using the feature amount acquired from the image by the image processing device 21 as input data and a result to be recognized from the aforementioned image as a teacher signal.

In the image captured by the camera 84, a high-dimensional feature amount is acquired from the aforementioned image by the image processing device 21 and is input into the learned BNN, and thereby a recognized result for the aforementioned image is output.

In the first embodiment, instead of inputting all the high-dimensional feature amounts output from the image processing device 21 with respect to this learned BNN, a portion effective for identification among the high-dimensional feature amounts is selected, thereby reducing dimensions (the number of input object data) used for the identification processing. Moreover, in the second embodiment, a low-dimensional feature amount output from the image processing device 21 is duplicated, thereby increasing the dimensions (the number of input object data). In the third embodiment in which the first embodiment and the second embodiment are combined with each other, a portion advantageous for identification is selected among the high-dimensional feature amounts output from the image processing device 21 and the selected feature amount is duplicated, thereby increasing the dimensions.

Compared with general neural networks which require multiplication using a floating point, etc., the BNN perform calculation by binary addition. Moreover, the dimension of the feature amount used for identification can be appropriately adjusted while ensuring the required identification accuracy, by selecting and duplicating the dimension of the feature amount. Accordingly, the identification device 201 can be implemented on a small-scale and low-power-consumption hardware circuit.

(2) Details of Embodiments

Figure 1:
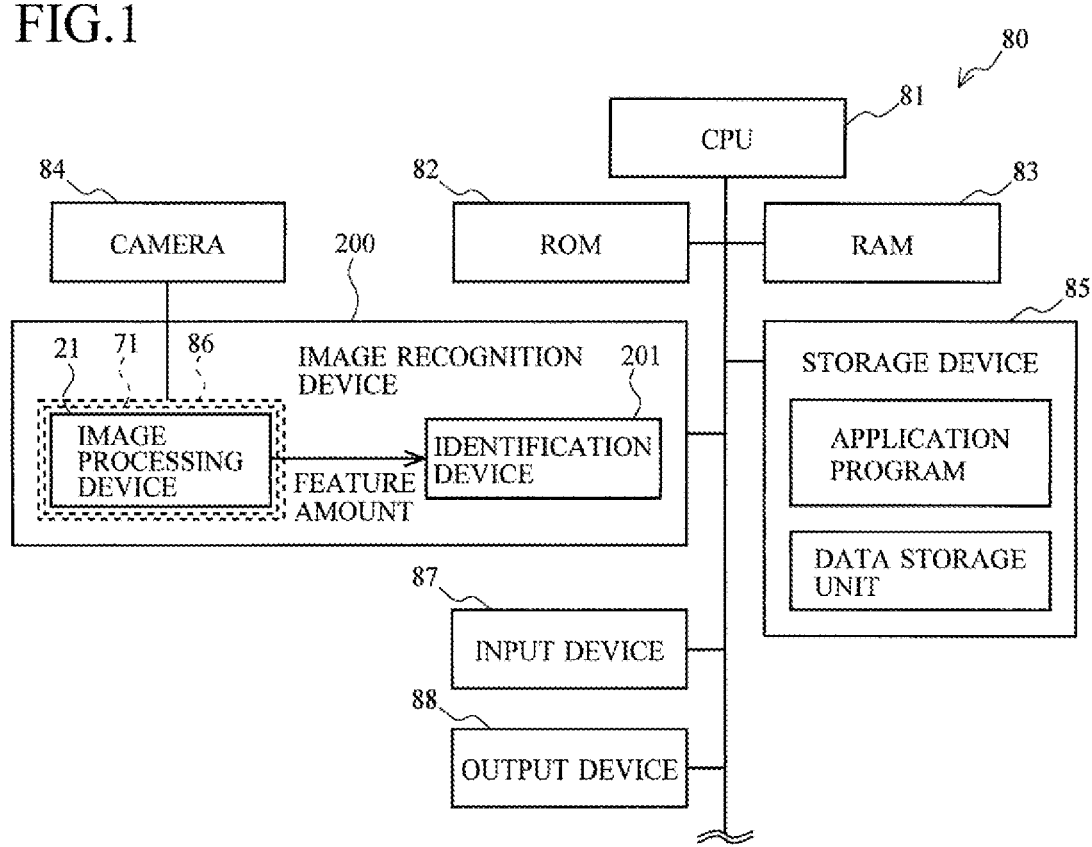
FIG. 1 is a drawing showing an example of a configuration of a computer on which an image recognition device is implemented.

FIG. 1 is a drawing showing an example of a configuration of a computer 80 on which an image recognition device 200 according to the present embodiment is implemented.

The computer 80 is mounted in vehicles and used for driving support, such as automatic driving and navigation, for example.

Although a case where the computer 80 performs image recognition processing will be described in the following, this technology can be widely applied to identification processing performed by artificial intelligence, such as voice recognition and medical diagnosis.

The computer 80 is composed of a Central Processing Unit (CPU) 81, a Read Only Memory (ROM) 82, a Random Access Memory (RAM) 83, a camera 84, an image recognition device 200, a storage device 85, an input device 87, an output device 88, and the like.

The CPU 81 performs desired processing in accordance with an application program stored in the storage device 85, and also performs control of each unit of the computer 80, for example.

The ROM 82 is a read only memory which stores basic programs, parameters, and the like to operate the computer 80 by the CPU 81.

The RAM 83 is a readable/writable memory which provides a working memory for the CPU 81 to exhibit an application function.

An identification result of the image recognition performed by the image recognition device 200 is stored in the RAM 83 and is used in accordance with an application program.

The camera 84 is a moving image capturing camera, and is configured to capture a moving image of a subject and to output the image data composed of moving image frames to the image recognition device 200 in accordance with a time series. The aforementioned image data is functioned as recording data in which the identification object is recorded.

The image recognition device 200 is an information processing device composed of a hardware device configured to identify a person who is an image recognition object (not a specific person but a general pedestrian or the like is meant herein) from image data, and to output an identification result thereof. The image recognition device 200 includes an image processing device 21 configured to extract and acquire a feature amount from the image data, and an identification device 201 configured to recognize and identify an identification object from the aforementioned extracted feature amount. The image processing device 21 is functioned as a feature description unit.

Generally, the image recognition system is composed as one set of a module configured to acquire the feature amount and a module configured to identify the feature amount.

The image processing device 21 is formed into a semiconductor chip (IC chip) with a semiconductor device 71, and the aforementioned IC chip is implemented on a video capture board 86. The details of a circuit configuration of the image processing device 21 will be described below (refer to FIG. 22 and the like).

By the way, there has been an image recognition technology for recognizing an object by extracting a luminance gradient distribution as a feature amount from an image, and comparing the extracted luminance gradient distribution with a luminance gradient distribution of a previously learned image.

As a feature amount according to the luminance gradient distribution, a Histograms of Oriented Gradients (HOG) feature amount has been well known and has been actively studied.

A Co-occurrence HOG (CoHOG) feature amount is one of a feature amount into which the HOG feature amount is developed, and has more robustness than that of the HOG feature amount.

Moreover, a Multi Resolution CoHOG (MRCoHOG) feature amount having further more robustness than that of the CoHOG feature amount has been proposed in recent years.

It has been clear by experiments that the MRCoHOG feature amount has extremely high robustness.

Further, a Haar-like feature amount is also present as another feature.

Such feature amounts can be applied to the image processing device 21. The latter half of this specification will describe a hardware configuration example of the image processing device 21 using the MRCoHOG feature amount, as an example.

The identification device 201 is Binarized Neural Networks (BNN, it is also called a binary neural network in Japan) that has learned an identification object in advance, and is configured to receive an input of the feature amount output from the image processing device 21 and to identify whether or not the identification object is present in the image data.

The identification device 201 is also formed into an IC chip. Although not illustrated, the identification device 201 with the semiconductor device 71 can also be implemented on the video capture board 86, and image recognition device 200 can also be realized by the integrated video capture board 86.

Alternatively, the image processing device 21 and the identification device 201 can be formed to be integrated with in the semiconductor device 71, and then can also be implemented on the video capture board 86.

The storage device 85 is a storage device using, e.g., a storage medium, such as a hard disk or a semiconductor memory, and is configured to store an application program which allows the CPU 81 to perform application processing using the identification result of the image recognition.

Moreover, the storage device 85 also includes a data storage unit storing an operation setting of the application program, and the like.

In this operation setting, when the image recognition device 200 detects a person, a content whether or not to issue an alarm to a driver is set by the user, for example.

The input device 87 is a device through which various kinds of information are input to the computer 80, and is composed of input devices such as operation buttons which allow a user to operate the computer 80.

The output device 88 is a device for outputting various information from the computer 80, for example, and is composed of output devices such as a liquid crystal display for display an operation screen or displaying a person detected by the image recognition device 200 on a moving image captured by the camera 84 to be surrounded with a rectangle frame.

Next, the identification device 201 will now be described.

The identification device 201 is configured to identify a feature amount with the BNN, i.e., binarized neural networks. As will be described later, the identification device 201 includes an identification unit 231 (FIGS. 5, 12, and 16) functioned as an identification means which has learned an identification object using multiple-valued weighting.

The reason why the identification device 201 uses the BNN is that a hardware circuit for performing multiplication or the like has a large area, and is difficult to be implemented on a semiconductor device, in the neural network using a general floating point.

As will be described later, since the weight of the BNN is a binary value of 1 and −1 and the BNN can be configured using an adder, a counter, and the like, a circuit area can be reduced to approximately $1/100$ in the case of using the floating point, for example, and it is easy to be implemented on hardware and power consumption is also reduced. Furthermore, as will be described later, identification performance which can be sufficient to practical use can be exhibited in spite of the small-scaled circuit configuration.

Figure 2:
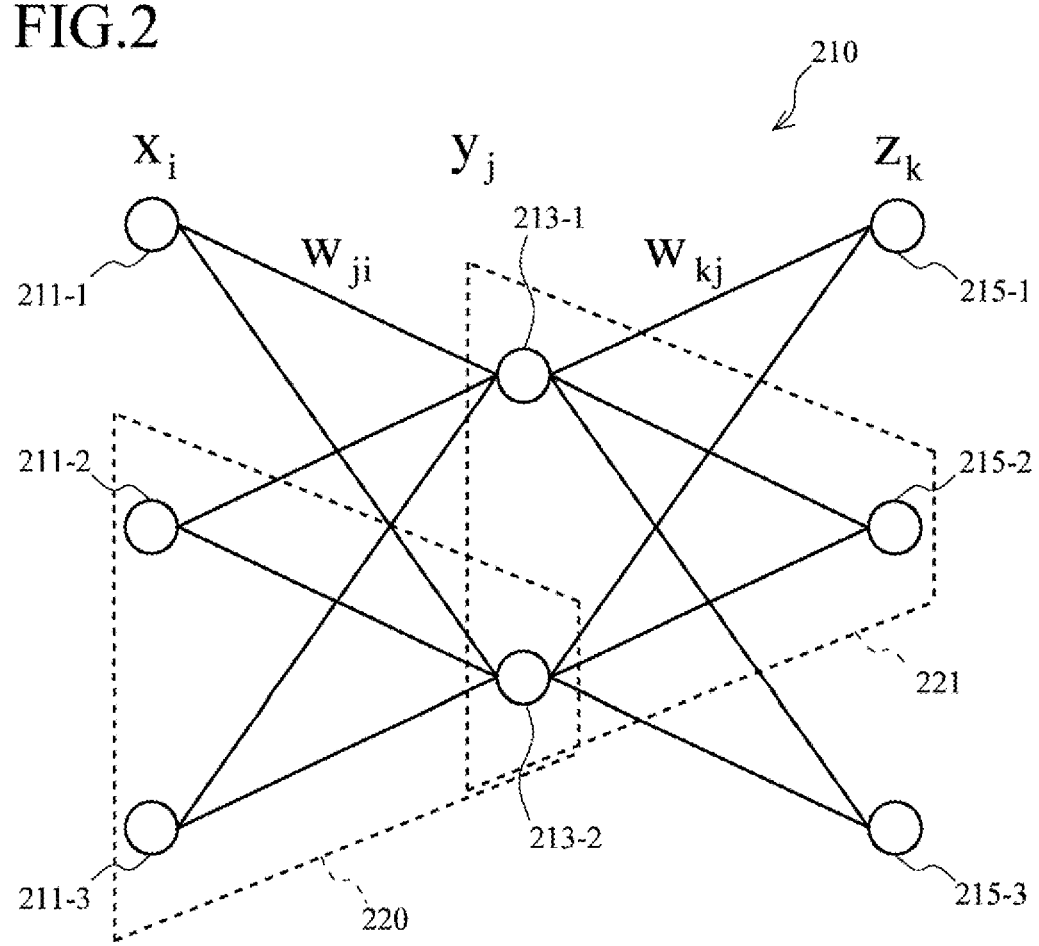
FIG. 2 is a drawing for describing a scheme of BNN.

FIG. 2 is a drawing for describing a scheme of the BNN used by the identification device 201.

The BNN 210 includes an input layer composed of input units 211-$i$ ($i=1, 2, 3$), an intermediate layer (hidden layer)

composed of intermediate units 213-$j$ ($j$=1, 2) constituting a hidden unit, and an output layer composed of output units 215-$k$ ($k$=1, 2, 3).

It is to be noted that the number of the units which constitute the input layer, the intermediate layer, and the output layer is an example, and may be any number.

These units are calculation units (perceptron) which constitute nodes of the neural network, and form the neural network by fully coupling the respective units between respective phases.

Hereinafter, when the input unit 211-$i$ is not particularly distinguished, it is simply referred to as an input unit 211, and the same applies to the intermediate unit 213 and the output unit 215.

For an output from the input unit 211-$i$ to the intermediate unit 213-$j$, a calculation weight Wji which takes any one value of the binary value of $\{-1, 1\}$ is set.

Also for an output from the intermediate unit 213-$j$ to the output unit 215-$k$, a calculation weight Wkj which takes any one value of the binary value of $\{-1, 1\}$ is set.

Although i, j, and k are expressed by subscripts in the diagrams, they are expressed in a normal size in the specification in order to prevent garbled characters. The same applies to other elements.

Moreover, although the variables x, y, z, and w are written in lower-case letters in the diagrams, these are written in upper-case letters of X, Y, Z, and W in the specification in order to improve visibility of the variables and the subscripts.

An Input Xi to the input unit 211-$i$ is a component of a feature amount output from the image processing device 21.

An activating function of the intermediate unit 213 is binarized to $\{-1, 1\}$, and an output Yj of the intermediate unit 213-$j$ takes any one of the binary value of $\{-1, 1\}$.

The output unit 215-$k$ sums up the output of the intermediate unit 213 and outputs the positive/negative sign thereof as a binary value of $\{-1, 1\}$.

An output Zk of the output unit 215-$k$ corresponds to a k-th identification object. For example, the output unit 215-1 corresponds to a person, outputs Z1=1 when a person is identified, and outputs Z1=−1 when no person is detected. The same applies to the other output units 215. Hereinafter, these calculations will now be described.

Figure 3:
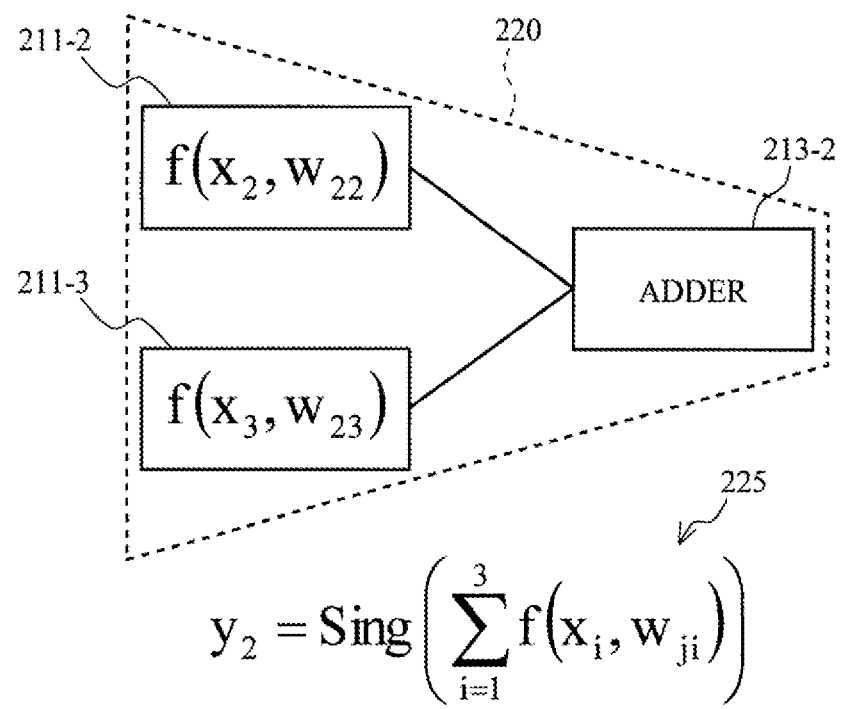
FIG. 3 is a drawing showing a portion of a region.

FIG. 3 is a drawing showing a portion 220 (a portion of the input layer and the intermediate layer) of FIG. 2.

The input unit 211-$i$ performs an operation f based on Wji (Xi, Wji) to the input Xi and outputs the result thereof to the intermediate unit 213-$j$. This operation is an operation for equalizing the positive/negative sign of Xi to the positive/negative sign of Wji; and if Wji is 1, f(Xi, Wji)=Xi, and if Wji is −1, f(Xi, Wji)=−Xi.

In the example of the drawing, the input units 211-2 and 211-3 respectively calculate f(X2, W22) and f(X3, W23) and output the results thereof to the intermediate unit 213-2.

On the other hand, the intermediate unit 213-$j$ adds a value output from each input unit 211-$i$ to the intermediate unit 213-$j$ in accordance with the equation 225, and outputs the positive/negative sign by outputting Yj=1 if the total value is zero or more but outputting Yj=−1 otherwise. Thus, the intermediate unit 213 is functioned as an adder for the input unit 211.

In the example of the drawing, the intermediate unit 213-2 adds output values from the input units 211-2 and 211-3.

Figure 4:
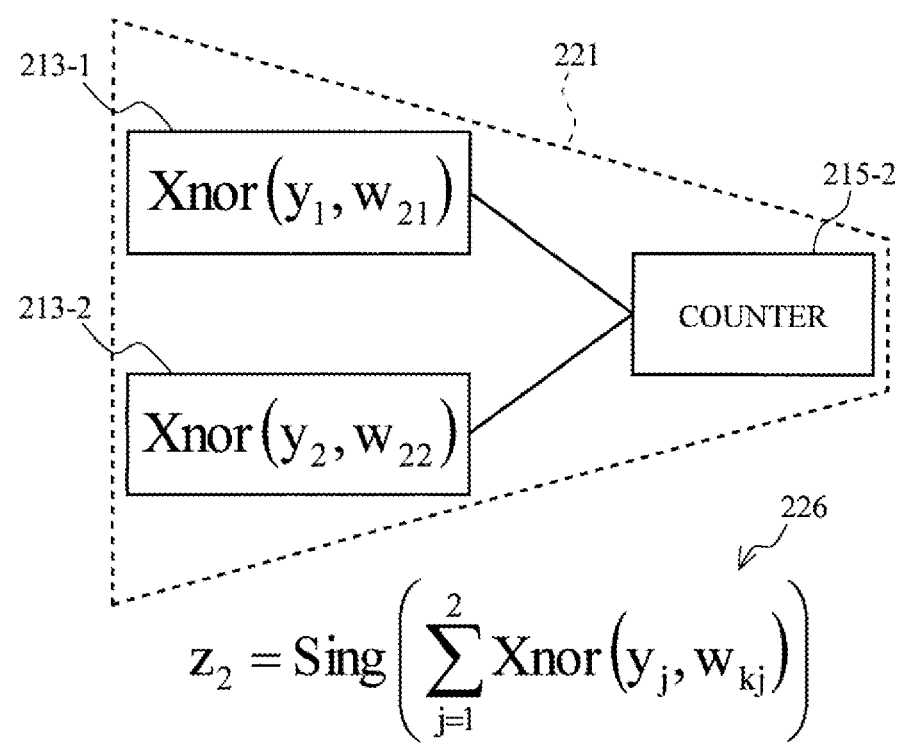
FIG. 4 is a drawing showing a portion of a region.

FIG. 4 is a drawing showing a portion 221 of FIG. 2.

The intermediate unit 213-$j$ takes the exclusive NOR between Yj and Wkj in accordance with Xnor(Yj, Wkj) in the equation 226 and outputs the result thereof to the output unit 215-$k$.

More specifically, the intermediate unit 213-$j$ outputs 1 to the output unit 215-$k$ if (Yj, Wkj) is (1, 1) and (−1, −1) but outputs −1 otherwise.

On the other hand, the output unit 215-$k$ is composed using a counter. The output unit 215-$k$ adds a binary value sent from each intermediate unit 213-$j$ in accordance with the equation 226 and outputs the positive/negative sign by outputting Zk=1 if it is zero or more but outputting Zk=−1 otherwise. The activating function is not applied to the output layer.

In the example of the drawing, the output unit 215-2 calculates the output values of the intermediate units 213-1 and 213-2 in accordance with the equation 226.

As described above, although the BNN 210 has been described with reference to FIGS. 2-4, these weights Wji and Wkj are set by learning.

For example, when the feature amount input from the input layer corresponds to a person, the output unit 215-1 is set as 1 and other output units 215 are set as −1; when the feature amount corresponds to a background, the output unit 215-2 is set as 1 and other output units 215 are set as −1; and when the feature amount corresponds to another object (e.g., a cat), the output unit 215-3 is set as 1 and other output units 215 are set as −1.

As previously described, since the weight etc. are real numbers in the case of the neural network using the general floating point, it is necessary to calculate floating point multiplication. However, the BNN 210 can be composed of the adding circuit using the adder and the counter (subtraction is also kind of addition).

Therefore, since the BNN 210 does not need to perform multiplication using a floating point and only needs to perform addition, the circuit configuration thereof can be simple and the circuit area can be reduced.

Thus, the binary neural networks (BNN 210) are composed using the adder for binarizing and adding the feature amount, and the counter for calculating the output of the aforementioned adder.

The BNN 210 described above has a single intermediate layer, but may have a multilayer structure. In this case, all intermediate layers perform calculation with the binary activating function in the similar manner to the intermediate unit 213.

Moreover, although the number of units in the intermediate layer is set less than that in the input layer or the output layer, it can be also larger than that in the input layer or the output layer. When the number of the intermediate layers is smaller, the input feature amount can be more narrowed down, and when the number of the intermediate layers is larger, the dimension of the feature amount increases and identification object can be easily separated. Since the number of units in the intermediate layer has such a property, an appropriate number thereof can be obtained by trial and error.

Moreover, although the BNN 210 is calculated using the binary value, the BNN 210 can also be configured so as to be calculated using three or more discrete values.

First Embodiment

Figures 5, 6:
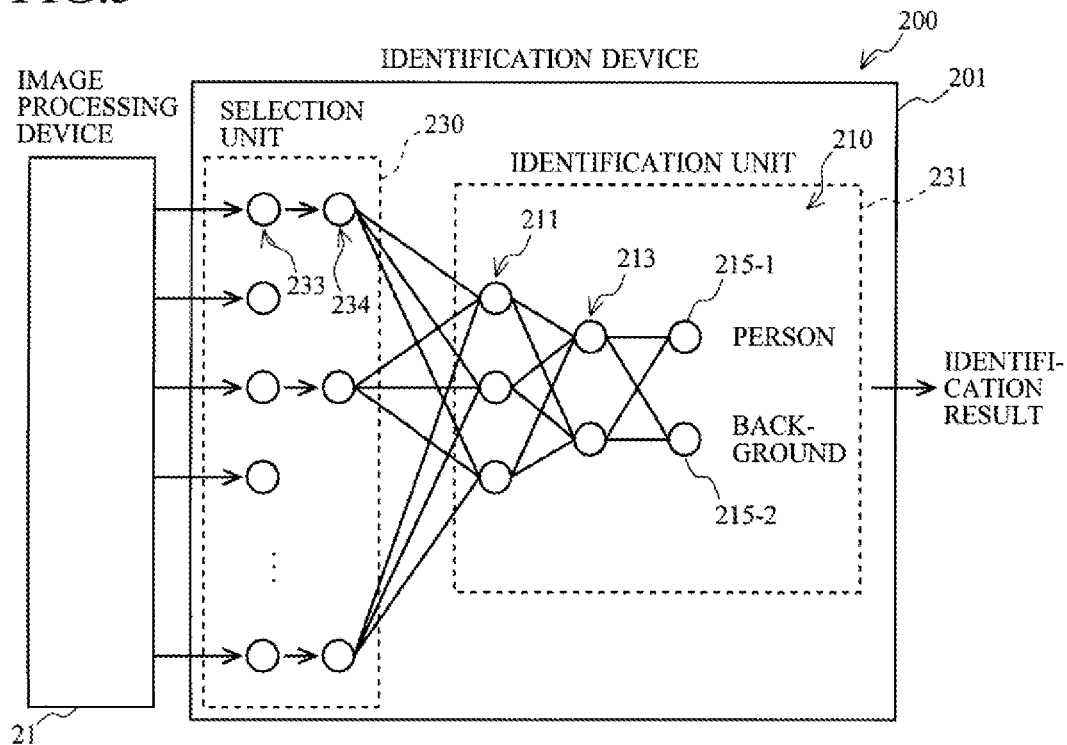
FIG. 5 is a drawing for describing an identification device.
FIG. 6 is a drawing showing an experimental result.

FIG. 5 is a drawing for describing an identification device 201 according to the present embodiment.

The identification device 201 includes a selection unit 230 and an identification unit 231.

The image processing device 21 extracts a high-dimensional feature amount from image data of a moving image frame, and outputs the extract feature amount to the selection unit 230.

Thus, the image processing device 21 is functioning as a feature amount acquiring means for acquiring the feature amount of the identification object data (image data).

Herein, the feature amount is a MRCoHOG feature amount, as an example. The MR-CoHOG feature amount is high-dimensional vector data having 32,592 dimensions (in which components are arranged in a predetermined order, specifically a histograms as described later), and is composed of 32,592 components.

The reason why the feature amount is set to the high dimension is that the image recognition device 200 is particularly effective in the case of such a high dimension, but it is also possible to use a feature amount that is not a high dimension.

The selection unit 230 selects a component composed of a predetermined portion specified in advance from a before-selection feature amount 233 input from the image processing device 21 and inputs a selected after-selection feature amount 234 into the identification unit 231.

Thus, the selection unit 230 is functioning as a selecting means for selecting a portion which is used for the identification specified in advance from the feature amount acquired by the extraction.

By selecting and culling the high-dimensional feature amount, the components of the feature amount used for the identification can be reduced. Thereby, a circuit of the identification device 201 can be miniaturized and a circuit area can also be reduced. Moreover, the power consumption can be reduced accordingly.

Although the portion of the feature amount to be selected may be specified at random, a portion effective in improvement in identification accuracy (detection accuracy for correctly detecting an object) is specified for selecting in order to improve identification performance, in the present embodiment.

Accordingly, in the present embodiment, a portion of the feature amount which contributes to improvement in the identification accuracy is determined using an algorithm of an identification instrument called Real AdaBoost (hereinafter RAdB).

Although the RAdB is an algorithm widely used for identification instruments, the present embodiment uses the RAdB for selecting the feature amount instead of for identification.

In the RAdB, when the number of components of the feature amount to be selected is specified, the components corresponding to the number thereof are automatically specified to be output. As described above, the inventors of the present application have reclaimed such a novel method for use of the RAdB.

Here, the selecting means selects, from the feature amount, a portion specified in advance by the identification algorithm, such as RAdB.

Moreover, the selecting means selects, from the feature amount, a portion, in which the identification accuracy by the identification means becomes high, specified in advance by the identification algorithm.

It is to be noted that the setting means of the portion to be selected is not be limited to this example, and may be determined from the characteristics of each feature description.

Since it is also possible to consider that an input terminal sequence of the before-selection feature amount 233 is an input layer, and to consider that an output terminal sequence of the after-selection feature amount 234 and the input layer composed of the input unit 211 are an intermediate layer composed of two layers, a part where the identification accuracy is increased may be searched while changing the component to be selected, as a part of the learning.

Although the RAdB is used for the selection unit 230 in a stage of specifying the component to be selected, this is used to be fixed, after once specified. Accordingly, the select function can be realized by connecting between the terminal of the before-selection feature amount 233 and the terminal of the after-selection feature amount 234 and terminating other terminals of the before-selection feature amount 233 instead of connecting.

Although the portion selected is determined from the viewpoint of specifying the component having a large effect at the time of identifying in the above-described example, the component to be selected can also be determined from the viewpoint of simplifying the circuit of the image processing device 21.

In other words, when a set of certain components of the feature amount is dependent on a certain circuit of the image processing device 21, and an influence on the identification performance is small without selecting the set of the components, and when the image processing device 21 can calculate another feature amount even if the circuit is omitted, the components belonging to the set together with the circuit for calculating the components can be omitted from the image processing device 21.

For example, in the MR-CoHOG feature amount, the histogram of co-occurrence of the luminance gradient is used as the feature amount among a low-resolution image, a medium-resolution image, and a high-resolution image. However, when the desired identification accuracy can be obtained if taking the co-occurrence between the low-resolution image and the high-resolution image, the medium-resolution image is unnecessary. Accordingly, it becomes possible to omit, from the image processing device 21, a circuit configuration for generating the medium-resolution image, for calculating the luminance gradient of the generated medium-resolution image, or for measuring the co-occurrence of the luminance gradient among the medium-resolution image, the low-resolution image, and the high-resolution image.

A portion of the feature amount from which desired identification accuracy is obtained from both of a viewpoint of selecting the component which contributes to the identification accuracy and a viewpoint of simplifying the circuit configuration of the image processing device 21 is driven therein, and thereby it is also possible to set the component to be selected.

In this case, the feature amount acquiring means acquires a feature amount based on distribution of co-occurrence of the luminance gradient extracted by the feature amount extraction means from the image data which is identification object data, and the selection means selects from the feature amount portion in which the extraction processing or the extraction circuit configuration by the feature amount extraction means is simplified, specified in advance by the identification algorithm.

The identification unit 231 uses the BNN 210, and performs identification processing using the after-selection feature amount 234 selected from the terminal sequence of the before-selection feature amount 233.

Thus, the identification unit 231 includes an input means for inputting the selected portion into the identification means, and is composed the binary neural network to which learning of the identification object (a person and a background in this example) is already conducted by binarized weighting.

When an object is identified from the person by the identification processing, the identification unit 231 sets the output unit 215-1 as 1 and sets the output unit 215-2 as −1, and outputs an identification result thereof, and when an object is identified from the background (no person is captured=background), the identification unit 231 sets the output unit 215-1 as −1 and sets the output unit 215-2 as 1, and outputs an identification result thereof.

Thus, the identification unit 231 includes an output means for outputting the identification result of being identified by the identification means using the input portion.

After composing such an image recognition device 200, the inventors of the present application have performed various experiments verify how much the number of the components of the feature amount can be narrowed down by selection and whether or not the circuit configuration of the identification unit 231 can be simplified.

These experiments will now be described. Each of the experiments have been performed using the MR-CoHOG feature amount.

FIG. 6 shows an experimental result showing change of identification accuracy in the case of reducing the number of intermediate units 213 in the intermediate layer while the number of input dimensions remains 32,592 (i.e., there are 32,592 input units 211) without selecting the feature amount.

For comparison, identification accuracy when the identification device 201 is composed of the RAdB is also written.

As shown in the drawing, the identification accuracy in the case of the RAdB is 97.59%.

On the other hand, the identification accuracy when sequentially reducing the number of the units in the intermediate layer to 1024, 256, 64, 16, 4, 2, and 1 is 98.32%, 98.29%, 98.41%, 98.31%, 98.26%, 98.12%, and 98.29%.

As can be seen from the experimental results, even if the number of the intermediate units 213 is one, the identification accuracy is 98% or more, and therefore it can sufficiently withstand to practical use.

FIG. 7 shows an experimental result showing change of identification accuracy in the case of reducing the number of intermediate units 213 in a state where the input dimensions is reduced to 500 dimensions (i.e., there are 500 input units 211) by selecting the feature amount.

As shown in the drawing, the identification accuracy in the case of the RAdB is 97.59%.

On the other hand, the identification accuracy when sequentially reducing the number of the units in the intermediate layer to 1024, 256, 64, 16, 4, 2, and 1 is 98.37%, 98.37%, 97.97%, 97.74%, 97.39%, 97.39%, and 97.05%.

As can be seen from the experimental results, even if the number of the intermediate units 213 is one, the identification accuracy is 97% or more, and therefore it can sufficiently withstand to practical use.

FIG. 8 shows an experimental result showing change of identification accuracy when the number of intermediate units 213 is reduced to one and the input dimensions of the feature amount to be selected are sequentially reduced from 500 (i.e., when the input units 211 are reduced from 500).

As shown in the drawing, the identification accuracy in the case of reducing the input dimensions to 500, 200, 100, 64, 32, 16, 8, and 4 is 97.13%, 95.79%, 94.52%, 93.30%, 91.79%, 90.03%, 88.57%, and 83.96%.

As can be seen from the experimental results, even if the input dimension is four-dimensional and the number of the intermediate units 213 is one, the identification accuracy is 83% or more, and therefore it can withstand to practical use depending on an application purpose. Moreover, when the input dimension is 16 dimensions or more, the identification accuracy is 90% or more, and therefore it can sufficiently withstand to practical use.

As described above, although the experimental results have been described with reference to FIGS. 6 to 8, the learning is performed whenever the input dimension or the number of the units are changed.

FIG. 9 shows a table comparing between a circuit scale when the identification device is composed of the RAdB and a circuit scale when the identification device is composed of the identification device 201. With regard to identification device 201, a case where the number of the intermediate units 213 is one is shown.

The resister is a memory having a small capacitor, and 137 resisters are required in the case of the RAdB, whereas only 16 resisters are sufficient in the case of the identification device 201.

The LUTs are lookup tables used in order to replace complicated computation by reference process of simple array.

1,226 LUTs are required in the case of the RAdB, whereas only 8 LUTs are sufficient in the case of the identification device 201.

The DSP is a digital signal processor, and 20 DSPs are required in the case of the RAdB, whereas no DSP is required in the case of the identification device 201.

The block RAM is a large-capacity memory, and two block RAMS are required in the case of the RAdB, whereas no block RAM is required in the case of the identification device 201.

As described above, the identification device 201 can be composed of a small-scaled circuit as compared with RAdB conventionally used as an identification instrument, and is suitable for being formed into a semiconductor device, i.e., an IC chip.

FIG. 10 is a table comparing between a memory capacity required when the identification device is composed by the RAdB and a memory capacity required when the identification device is composed of the identification device 201 having one intermediate unit.

As shown in the table, 1024 kilobits are required for the RAdB, whereas only 0.5 kilobit is required for the identification device 201 (when the feature amount to be selected is 500 dimensions).

Figure 11:
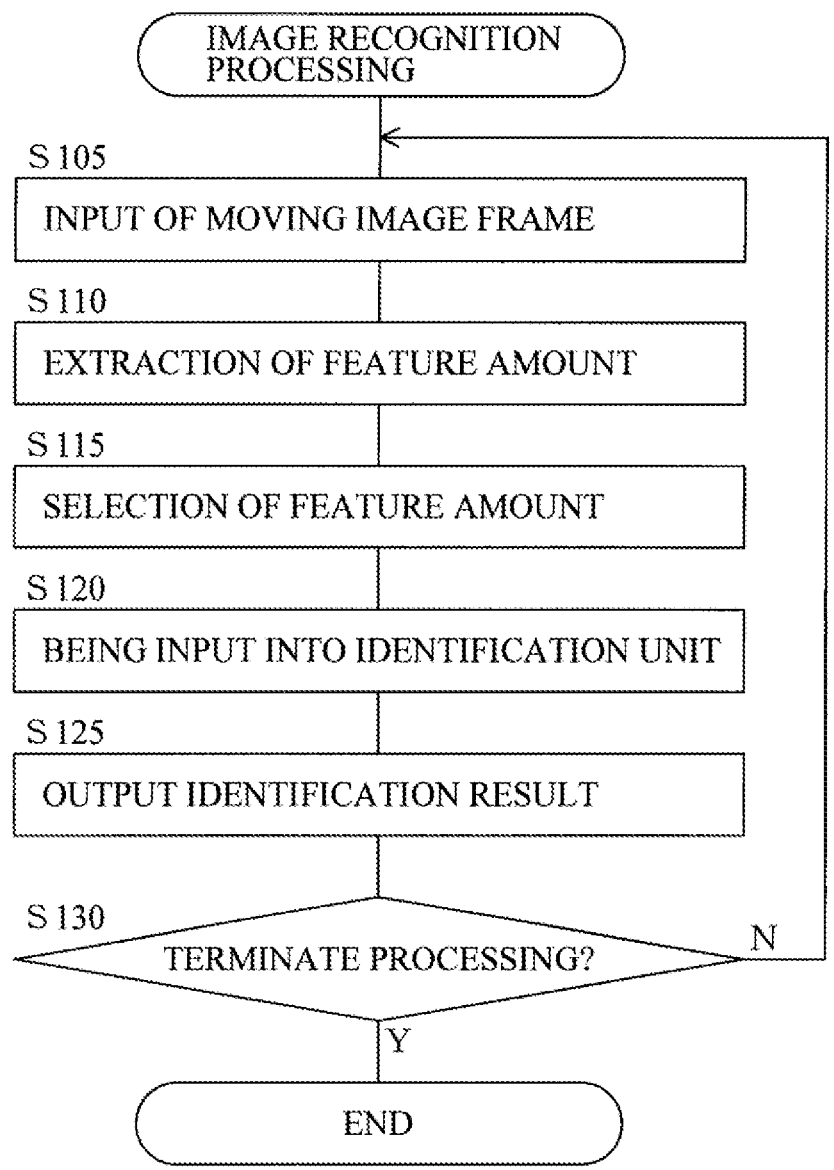
FIG. 11 is a flow chart for describing an operation of the image recognition device.

FIG. 11 is a flow chart for describing an operation of the image recognition device 200 of the present embodiment.

The following processing is performed by hardware circuits of the image processing device 21 and the identification device 201.

First, the image processing device 21 receives an input of a moving image frame output from the camera 84 (Step 105).

Next, the image processing device 21 processes the moving image frame in accordance with the circuit, extracts before-selection feature amount 233 of the moving image frame to be output to the identification device 201 (Step 110).

On the other hand, the identification device 201 selects the before-selection feature amount 233 received from the image processing device 21 in the selection unit 230 (Step 115), and inputs the after-selection feature amount 234 into the identification unit 231 (Step 120).

Next, the identification device 201 performs identification processing by calculating the after-selection feature amount 234 using the BNN 210, and outputs an identification result obtained as a result of the calculation (Step 125).

Next, the image recognition device 200 determines whether or not to terminate the processing, and if terminating the processing (Step 130; Y), the image recognition device 200 terminates the image recognition processing, whereas if not terminating the processing (Step 130; N), the image recognition device 200 returns to Step 105 to perform the image recognition processing for the next moving image frame.

The determination whether or not to terminate the processing is on the basis of determining whether or not a user has instructed the termination from a menu screen which is not illustrated, for example.

According to the first embodiment described above, the following effects can be obtained.

(1) When the image recognition device 200 identifies using the BNN 210, the image recognition device 200 can select a feature important for the identification from the high-dimensional feature amount and can be input into the input layer of the BNN 210.

The processing cost is increased since the calculation is performed using all high-dimensional feature amount in the conventional technology disclosed in Non-Patent Literature 1, but the calculation cost and the hardware resources can be reduced by selecting the feature amount to be input as in this embodiment.

(2) Reduction in the processing cost can be realized by using the BNN 210 for the identification unit 231, and binarizing the weight and the activating function for the intermediate layer (the input into the intermediate layer and the output from the intermediate layer). Moreover, when the BNN 210 is implemented in hardware, it can be calculated by the adder and the counter, and thereby it can be implemented at low cost.

(3) Selection of the feature amount important for the identification can be specified using the RAdB. Consequently, since the portion of the feature amount which effectively acts in the identification accuracy is selected, the number of dimensions and the intermediate unit 213 can be significantly reduced.

(4) Even when the feature amount is selected to be input, high identification performance can be maintained, and therefore it can be implemented in a weight lighter than RAdB also in a circuit scale.

(5) In a present embodiment, although the identification device 201 is realized by hardware, it can be easily constructed also by software.

Second Embodiment

A low-dimensional feature amount may be used depending on the image processing device 21.

For example, in the technology of Non-Patent Literature 2, since the identification is performed from a low-dimensional feature amount (i.e., approximately 500 dimensions), detection accuracy of a person is limited.

When performing more highly accurate detection, it is necessary to calculate a high-dimensional feature amount, but the calculation cost is increased if all the feature amounts are calculated as they are.

Moreover, studies have been conducted to further multi-value the BNN, in order to ensure required identification accuracy.

However, if the feature amount is formed into high dimensions or the neural network is multiple-valued, a circuit is complicated and the circuit area is also increased.

For that reason, the inventors of the present application have succeeded in improving the identification accuracy by duplicating a low-dimensional feature amount while the neural network remains binarized.

Hereinafter, image recognition processing according to the aforementioned duplication will now be described.

FIG. 12 is a drawing for describing an identification device 201 according to the present embodiment.

The image recognition device 200 is composed of an image processing device 21 and an identification device 201, and the identification device 201 includes a duplication unit 240 and an identification unit 231.

The image processing device 21 outputs a feature amount extracted from a moving image frame to the duplication unit 240.

As an example, the image processing device 21 is configured to extract from the moving image frame a low-dimensional approximately 100-dimensional HOG feature amount (i.e., approximately 100 components are present), and to output the extracted HOG feature amount to the duplication unit 240.

Here, the image processing device 21 is functioning as a feature amount acquiring means for acquiring the feature amount of an identification object from recording data (image data of the moving image frame) in which the aforementioned identification object is recorded. The identification device 201 includes an identification object data acquiring means for acquiring the aforementioned feature amount as the identification object data.

Moreover, the feature amount acquiring means acquires distribution of co-occurrence of the luminance gradient according to the HOG feature amount, in the aforementioned image data, as the feature amount.

The duplication unit 240 duplicates a before-duplication feature amount 243 input from the image processing device 21 by a predetermined number, and generates an after-duplication feature amount 244 (duplicated to twice in the example of the drawing) to be input into the identification unit 231.

Thus, the duplication unit 240 includes the duplication means for duplicating the identification object data.

The duplication is performed by connecting an output terminal of the before-duplication feature amount 243 to input terminals of a plurality of the after-duplication feature amounts 244 in parallel, for example.

By redirecting an output destination of the before-duplication feature amount 243 to the terminals of the plurality of the after-duplication feature amount 244, each component may be input into the identification unit 231 multiple times by sequentially outputting the before-duplication feature amount 243, and such a case is also included in the duplication.

The identification unit 231 uses the BNN 210 performs identification processing using the after-duplication feature amount 244 selected from the terminal sequence of the before-duplication feature amount 243.

Thus, the identification unit 231 includes an input means for inputting the duplicated identification object data into the identification means, and is composed the binary neural network to which learning of the identification object (a person and a background in this example, as described in the following) is already conducted by binarized weighting.

The BNN 210 which constitutes the binary neural network is composed using an adder configured to multiple-value and add the duplicated identification object data, and a counter configured to count the output of the adder.

When an object is identified from the person by the identification processing, the identification unit 231 sets the output unit 215-1 as 1 and sets the output unit 215-2 as −1, and outputs an identification result thereof, and when an object is identified from the background (no person is captured=background), the identification unit 231 sets the output unit 215-1 as −1 and sets the output unit 215-2 as 1, and outputs an identification result thereof.

Thus, the identification unit 231 includes an output means for outputting the identification result of being identified using the input identification object data.

FIG. 13 is a drawing for considering an improvement in identification accuracy by duplicating a feature amount.

As shown in the subsequent experimental results, when the dimensions are increased by duplicating the feature amount to be input into the identification unit 231, the identification accuracy can be improved.

This is for the following reasons. Since a weight and an activating function are binarized for calculation in the intermediate layer as shown in the left diagram of FIG. 13 when not duplicating, the value which can be expressed inside the networking system from one component of the feature amount is limited to $\{-X, X\}$. In contrast, when being duplicated to twice, as shown in the right diagram thereof, the value which can be expressed is increased to $\{-2X, 0, 2X\}$. When being duplicated to three times or more, the value which can be expressed is further increased.

FIG. 14 shows experimental results showing change of identification accuracy due to the duplication.

The identification accuracy when a feature amount acquired from the original image data is 100-dimensional and is not duplicated, the identification accuracy when this is duplicated to twice (2× magnification) (duplicated once) to be 200 dimensions, the identification accuracy when further being duplicated to three times (3× magnification) (duplicated twice) to be 300 dimensions, the identification accuracy when being duplicated to four times (4× magnification) (duplicated 3 times) to be 400 dimensions, the identification accuracy when being duplicated to five times (5× magnification) (duplicated four times) to be 500 dimensions, and the identification accuracy when the feature amount is 500-dimensional and is not duplicated are respectively 94.52%, 95.56%, 95.81%, 96.18%, 96.09%, and 97.13%.

Thus, since the identification accuracy is improved whenever increasing the number of the duplications, and the identification accuracy of approximately 94.5% to approximately 96% can be ensured, it can sufficiently withstand to practical use.

As proved from this experiment, the identification accuracy can be improved by a simple process of duplicating low-dimensional feature amounts, without using high-dimensional feature amounts or multi-valuing the neural networks to three or more values.

Figure 15:
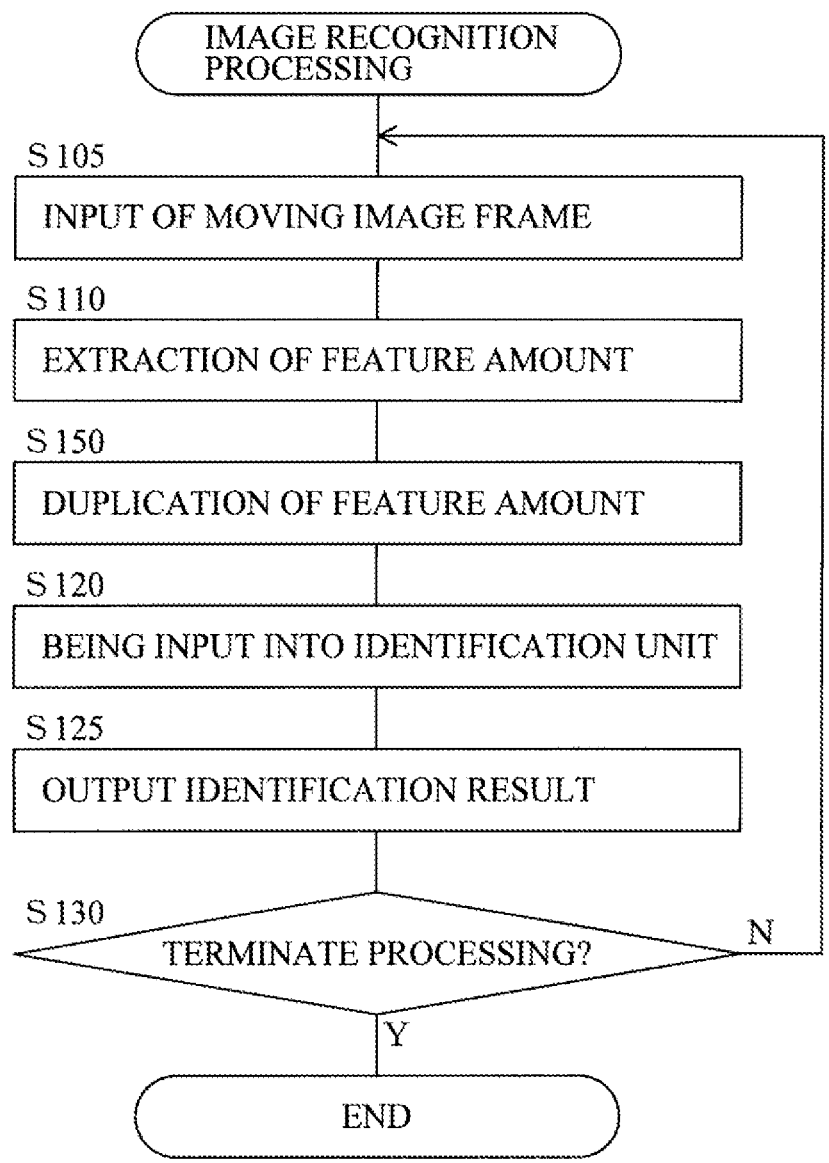
FIG. 15 is a flow chart for describing an operation of the image recognition device.

FIG. 15 is a flow chart for describing an operation of the image recognition device 200 of the present embodiment.

The following processing is performed by hardware circuits of the image processing device 21 and the identification device 201.

First, the image processing device 21 receives an input of a moving image frame output from the camera 84 (Step 105).

Next, the image processing device 21 processes the moving image frame in accordance with the circuit, extracts the feature amount (before-duplication feature amount 243) of the moving image frame to be output to the identification device 201 (Step 110).

On the other hand, the identification device 201 duplicates the before-duplication feature amount 243 received from the image processing device 21 (Step 150), and inputs the generated after-duplication feature amount 244 into the identification unit 231 (Step 120).

Next, the identification unit 231 in the identification device 201 calculates the input after-duplication feature amount 244, and the identification device 201 outputs the identification result obtained as a result of the calculation (Step 125).

Next, the image recognition device 200 determines whether or not to terminate the processing, and if terminating the processing (Step 130; Y), the image recognition device 200 terminates the image recognition processing, whereas if not terminating the processing (Step 130; N), the image recognition device 200 returns to Step 105 to perform the image recognition processing for the next moving image frame.

The determination whether or not to terminate the processing is on the basis of determining whether or not a user has instructed the termination from a menu screen which is not illustrated, for example.

It is to be noted that, in the present embodiment, although the feature amount is extracted from the image data of the moving image frame, the image data of the moving image frame can be directly input to the identification device 201 without providing the image processing device 21 in the image recognition device 200.

In this case, the identification object data acquired by the identification data acquiring means is image data (corresponding to recording data) of the moving image frame.

Moreover, the number of duplications may be changed for each component, for example, a first component of the feature amount is duplicated to two pieces, a second component is duplicated to four pieces, and so on.

According to the second embodiment described above, the following effects can be obtained.
(1) When the identification is performed using the BNN 210, the feature amount is duplicated and is input into the input layer of the BNN 210. By duplicating the input feature amount, the value that can be expressed inside the network is increased, and the identification performance of the identification unit 231 can be improved.
(2) Reduction in the processing cost can be realized by using the BNN 210 for the identification unit 231, and binarizing the weight and the activating function in the intermediate layer. Moreover, when the BNN 210 is implemented in hardware, it can be calculated by the adder and the counter, and thereby it can be implemented at low cost.
(3) Even in the case of inputting a low-dimensional feature amount, since the duplication is performed without extracting another feature amount, the calculation cost in the image processing device 21 can be reduced.
(4) Since the BNN 210 can be composed of the adder and the counter when being implemented in hardware, it can be implemented at low cost even if the number of inputs is increased by duplicating the feature amount.

(5) In a present embodiment, although the identification device 201 is realized by hardware, it can be easily constructed also by software.

Third Embodiment

Figure 16:
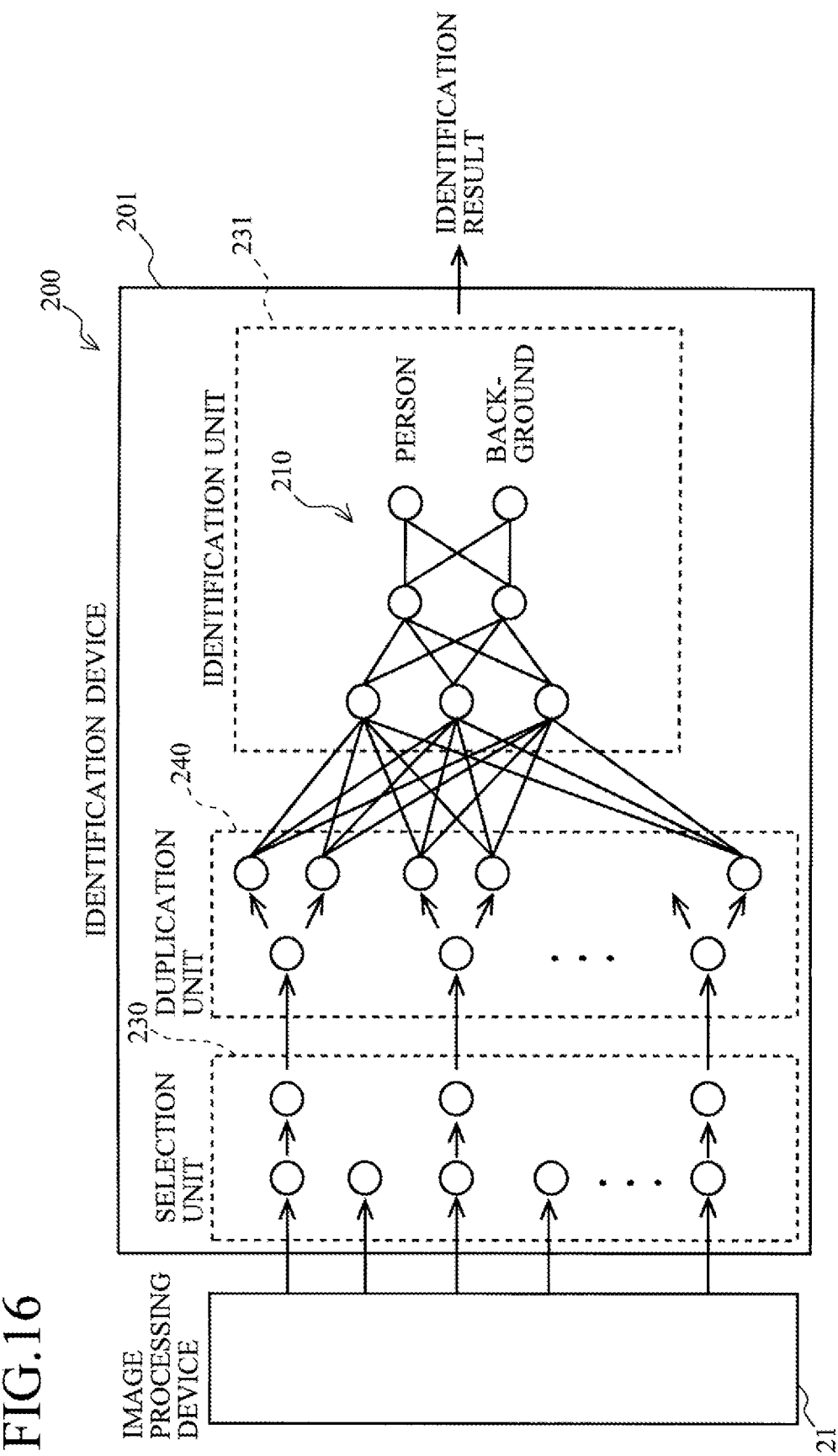
FIG. 16 is a drawing for describing an identification device.

FIG. 16 is a drawing for describing an identification device 201 according to the present embodiment.

The identification device 201 of the present embodiment is composed by combining the first embodiment and the second embodiment with each other.

The identification device 201 includes a selection unit 230, a duplication unit 240, and an identification unit 231; and these configurations are the same as those described in the above embodiments.

The image processing device 21 outputs a feature amount to the selection unit 230, and the selection unit 230 selects a component used for identification and inputs the selected component into the duplication unit 240.

In response, the duplication unit 240 duplicates the feature amount input from the selection unit 230 to be input into the identification unit 231.

Then, the identification unit 231 calculates the duplicated feature amount, to identify the image recognition object.

It is to be noted that wiring may be provided in the identification device 201 so that the input means of identification device 201 may perform the duplication, without providing the after-duplication feature amount 244.

Thus, the image recognition device 200 of the present embodiment includes a selection means for selecting, from feature amount, a portion which is used for the identification which is specified in advance, a duplication means for duplicating the portion selected by the aforementioned selection means, and an input means for inputting the portion selected by the selection means and the portion duplicated by the duplication means into the identification means.

Figure 17:
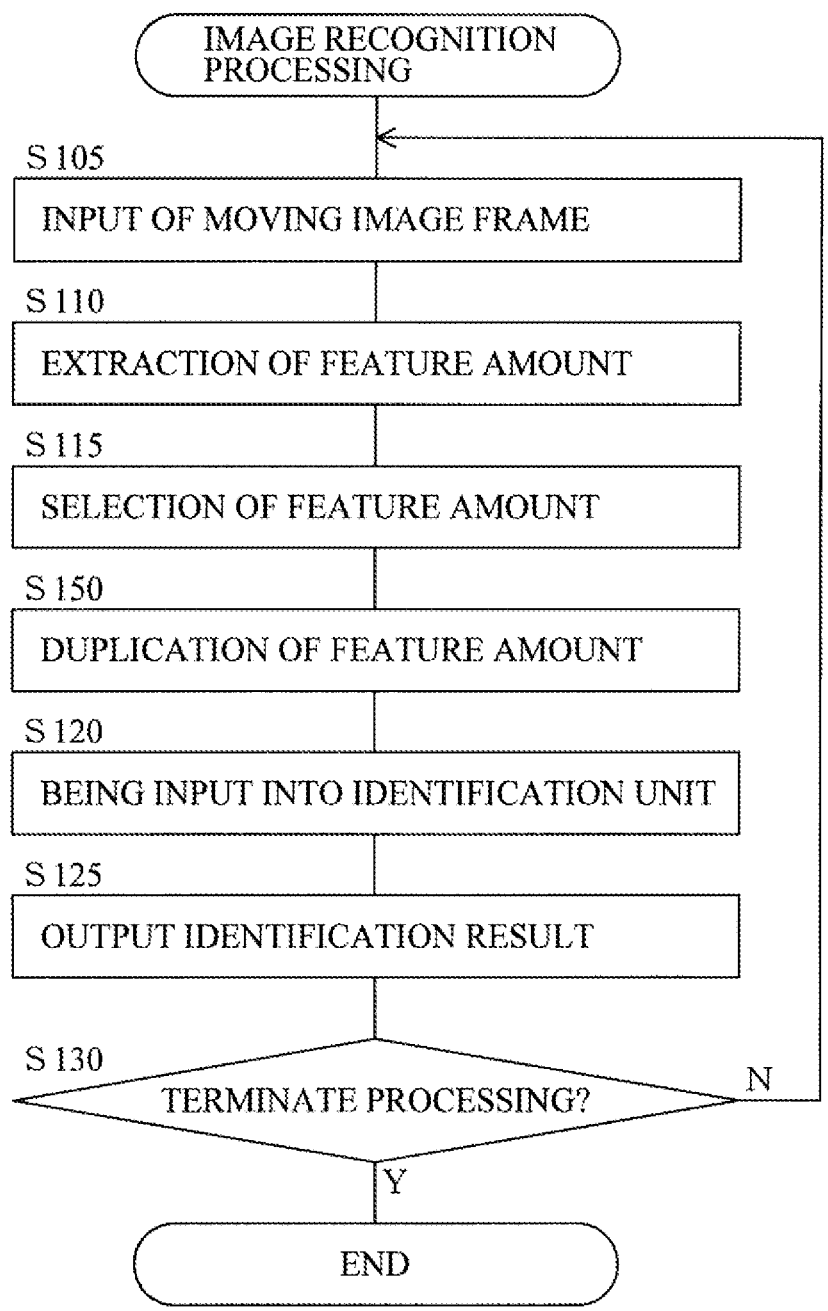
FIG. 17 is a flow chart for describing an operation of the image recognition device.

FIG. 17 is a flow chart for describing an operation of the image recognition device 200 of the present embodiment.

The following processing is performed by hardware circuits of the image processing device 21 and the identification device 201.

First, the image processing device 21 receives an input of a moving image frame output from the camera 84 (Step 105).

Next, the image processing device 21 processes the moving image frame in accordance with the circuit, extracts the feature amount (before-selection feature amount 233) of the moving image frame to be output to the identification device 201 (Step 110).

On the other hand, the identification device 201 selects the before-selection feature amount 233 received from the image processing device 21 in the selection unit 230 (Step 115), and inputs the after-selection feature amount 234 into the duplication unit 240.

The duplication unit 240 receives the after-selection feature amount 234 input from the selection unit 230 as a before-duplication feature amount 243 to be duplicated (Step 150), and inputs the after-duplication feature amount 244 into the identification unit 231 (Step 120).

Next, the identification device 201 performs identification processing by calculating the duplicated feature amount using the BNN 210 in the identification unit 231, and outputs an identification result obtained as a result of the calculation (Step 125).

Next, the image recognition device 200 determines whether or not to terminate the processing, and if terminating the processing (Step 130; Y), the image recognition device 200 terminates the image recognition processing, whereas if not terminating the processing (Step 130; N), the image recognition device 200 returns to Step 105 to perform the image recognition processing for the next moving image frame.

The determination whether or not to terminate the processing is on the basis of determining whether or not a user has instructed the termination from a menu screen which is not illustrated, for example.

As described above, although the duplication is performed after the selection, the order of the duplication unit 240 and the selection unit 230 may be replaced with each other to perform the selection after the duplication of the feature amount.

The first to third embodiments described above can be configured as follows.

(Eleventh Configuration)

An information processing device comprising: a feature amount acquiring means configured to acquire a feature amount of identification object data; a selection means configured to select a feature amount of a portion, used for identification, specified in advance from the feature amount acquired by the feature amount acquiring means; an identification means configured to have learned an identification object using multiple-valued weighting; an input means configured to input the feature amount of the portion selected by the selection means into the identification means; and an output means configured to output an identification result of being identified by the identification means using the feature amount of the portion input by the input means.

(Twelfth Configuration)

The information processing device according to the eleventh configuration, wherein in the identification means, the learning of the identification object is conducted by binarized weighting.

(Thirteenth Configuration)

The information processing device according to the eleventh configuration or twelfth configuration, wherein the selection means selects a feature amount of a portion specified by an identification algorithms, such as RAdB, in advance, from the feature amount acquired by the feature amount acquiring means.

(Fourteenth Configuration)

The information processing device according to the thirteenth configuration, wherein the selection means selects a feature amount of a portion, in which identification accuracy by the identification means becomes high, specified by the identification algorithm in advance, from the feature amount acquired by the feature amount acquiring means.

(Fifteenth Configuration)

The information processing device according to the thirteenth configuration, wherein the feature amount acquiring means acquires a feature amount based on distribution of co-occurrence of a luminance gradient extracted by the feature amount extraction means from the image data which is identification object data, and the selection means selects a feature amount of a portion in which extraction processing or an extraction circuit configuration by the feature amount extraction means is simplified, specified by the identification algorithm in advance, from the feature amount acquired by the feature amount acquiring means.

(Sixteenth Configuration)

The information processing device according to any one of the eleventh to fifteenth configurations, wherein the identification means is a binary neural network.

(Seventeenth Configuration)

The information processing device according to the sixteenth configuration, wherein the binary neural network is composed using an adder for binarizing and adding the feature amount of the portion, and a counter for calculating an output of the adder.

(Eighteenth Configuration)

The information processing device according to any one of the eleventh to sixteenth configurations, further comprising a duplication means configured to duplicate the feature amount of the portion selected by the selection means, wherein the input means inputs into the identification means the feature amount of the portion selected by the selection means and the feature amount of the portion duplicated by the duplication means.

(Twenty-First Configuration)

An information processing device comprising: an identification object data acquiring means configured to acquire identification object data; an identification means configured to have learned an identification object using multiple-valued weighting; a duplication means configured to duplicate the identification object data acquired by the identification object data acquiring means; an input means configured to input the identification object data duplicated by the duplication means into the identification means; and an output means configured to output an identification result of being identified by the identification means using the feature object data of the portion input by the input means.

(Twenty-Second Configuration)

The information processing device according to the twenty-first configuration, wherein in the identification means, the learning of the identification object is conducted by binarized weighting.

(Twenty-Third Configuration)

The information processing device according to the twenty-first configuration or twenty-second configuration, wherein the identification means is a binary neural network.

(Twenty-Fourth Configuration)

The information processing device according to the twenty-first configuration, the twenty-second configuration, or the twenty-third configuration, further comprising: a feature amount acquiring means configured to acquire a feature amount of an identification object from recording data in which the aforementioned identification object is recorded, wherein the identification object data acquiring means acquires the feature amount acquired by the feature amount acquiring means as an identification object data.

(Twenty-Fifth Configuration)

The information processing device according to the twenty-fourth configuration, wherein the recording data are image data, and the feature amount acquiring means acquires distribution of co-occurrence of a luminance gradient in the image data as the feature amount.

(Twenty-Sixth Configuration)

The information processing device according to the twenty-third configuration, wherein the binary neural network is composed using an adder for multiple-valuing and adding the identification object data duplicated by the duplication means, and a counter for calculating an output of the adder.

(Configuration of Image Processing Device 21)

Although three embodiments with regard to the identification device 201 have been described above, the image processing device 21 which is another element constituting the image recognition device 200 will now be described hereinafter.

(1) An Overview of the Identification Device 201

The image processing device 21 (FIG. 22) arranges: in parallel, a processing line for high-resolution images composed from a three lines buffer 25a to a buffer 28a for extracting a luminance gradient direction from a high-resolution image; a processing line for medium-resolution images composed from a medium-resolution unit 24b to a buffer 28b for extracting a luminance gradient direction from a medium-resolution image; and a processing line for low-resolution images composed from a low-resolution unit 24c to a buffer 28c for extracting a luminance gradient direction from a low-resolution image. The image processing device 21 simultaneously extracts the luminance gradient direction for every pixel from the three resolution images in parallel.

Each of co-occurrence-matrix creation units 30a, 30b, and 30c is configured to create a co-occurrence matrix using the luminance gradient direction extracted from the three resolution images, and a histogram creating unit 31 outputs a histogram as a MRCoHOG feature amount using this co-occurrence matrix.

Since three resolution images are simultaneously processed, high-speed processing can be realized, and moving images output from a camera can be processed in real time.

(2) Details of the Identification Device 201

First, the HOG feature amount, the CoHOG feature amount, and the MRCoHOG feature amount will now be briefly described.

FIG. 18 are drawings for illustrating a concept of the HOG feature amount.

The HOG feature amount is extracted from an image by the following procedure.

Figure 18A:
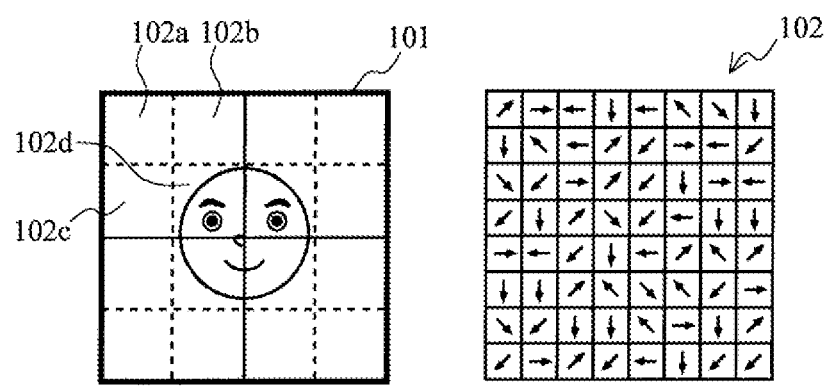
FIG. 18 are drawings for describing a concept of the HOG feature amount.

An image 101 shown in a left drawing of FIG. 18(a) is assumed to be image-of-interest regions extracted by an observation window etc. for observing an object.

First, the image 101 is divided into rectangular cells 102a, 102b, . . . .

Next, as shown in a right drawing of FIG. 18(a), luminance gradient directions (directions from a low luminance toward a high luminance) of respective pixels are quantized into, e.g., eight directions in accordance with each cell 102.

Figure 18B:
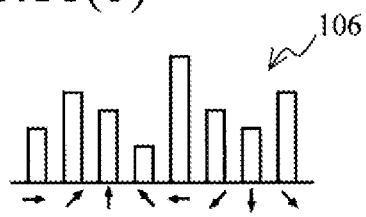

Subsequently, as shown in FIG. 18(b), the quantized directions of the luminance gradients are determined as classes, and a histogram showing the number of occurrence as a frequency is produced, whereby the histogram 106 of the luminance gradients included in the cell 102 is produced in accordance with each cell 102.

Further, normalization is performed in such a manner that a total frequency of the histograms 106 becomes 1 in blocks each forming a group of several cells 102.

In the example shown in the left drawing of FIG. 18(a), the cells 102a, 102b, 102c, and 102d form one block.

Figure 18C:
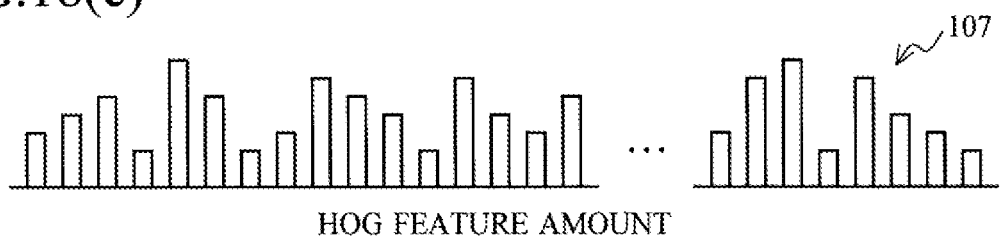

A histogram in which the histograms 106a, 106b, . . . normalized in this manner are arranged in a line as shown in FIG. 18(c) becomes a HOG feature amount 107 of the image 101.

FIG. 19 are drawings for describing the CoHOG feature amount.

The CoHOG feature amount is the feature amount focusing on a gradient pair between two pixels in a local region, and is extracted from an image by the following procedure.

Figure 19A:
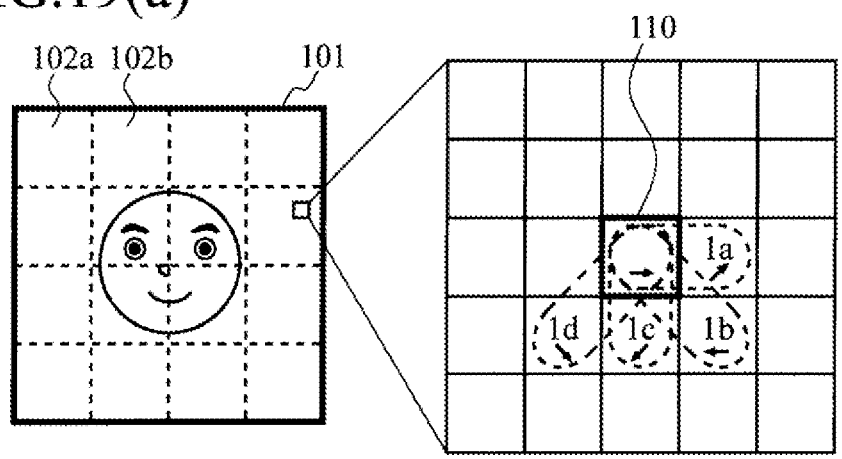
FIG. 19 are drawings for describing a concept of the CoHOG feature amount.

As shown in FIG. 19(a), an image 101 is divided into rectangular cells 102a, 102b, . . . . The cell is also called a block.

In the CoHOG feature amount, a pixel of interest 110 is set to the cells 102a, 102b, . . . , and a co-occurrence matrix (histogram with regard to the pixel of interest 110) is created with a combination of the luminance gradient direction of the pixel of interest 110 and the luminance gradient direction of pixels which are at distances 1 to 4 from the pixel of interest 110. The pixel related to the combination with the pixel of interest 110 is called offset.

For example, the distance from the pixel of interest 110 is expressed by expression, and when the aforementioned expression is applied, pixels 1a to 1d which are adjacent to the pixel of interest 110 are obtained as a pixel at the distance 1, as shown in FIG. 19(a).

It is to be noted that the reason why the upper and left pixels of the pixel of interest 110 are not comprised in the combination is that the pixel of interest 110 is set and processed in order from the left end of the top pixel row toward the right; and therefore the processing has been already completed.

Next, the luminance gradient directions of the pixel of interest 110 and the pixel 1a are observed. The luminance gradient direction is quantized into, for example, eight directions, and the directions are shown by the arrows in the drawing.

The luminance gradient direction of the pixel of interest 110 is a right direction, and the luminance gradient direction of the pixel 1a is an upper right direction.

Figure 19B:
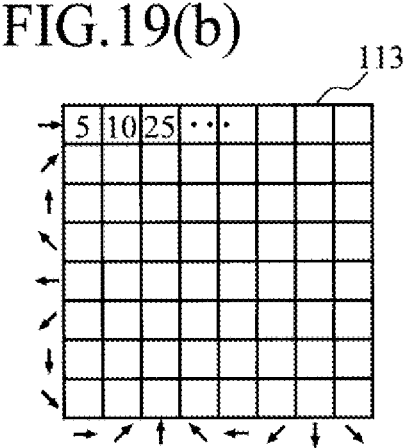

Therefore, one vote is cast for an element of (row number, column number)=(right direction, upper right direction), in the co-occurrence matrix 113 shown in FIG. 19(b).

In the example of FIG. 19(b), as a set of the luminance gradient directions of the pixel of interest 110 and the pixel 1a, as a result of adding 1 to an element of a row in which the arrow in the right direction is described as a row number and a column in which the arrow in the upper right direction is described as a column number, the value of the aforementioned element is 10.

It is to be noted that the co-occurrence matrix 113 should be fundamentally drawn with a three-dimensional histogram and the number of votes should be fundamentally expressed by a bar graph in a height direction, but the number of votes is expressed by a numerical value in order to simplify the drawing.

Hereinafter, voting (counting) according to the combination of the pixel of interest 110 and the pixels 1b, 1c, and 1d is similarly performed.

Figure 19C:
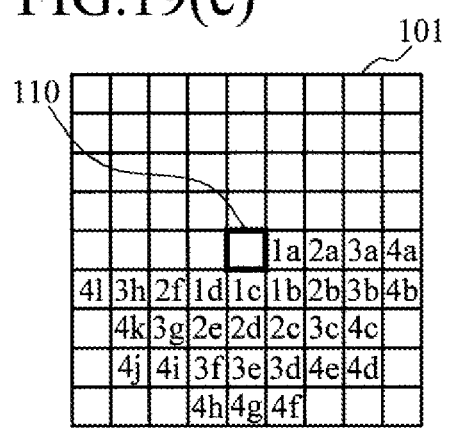

As shown in FIG. 19(c), centered on the pixel of interest 110, the pixels of the distance 2 is specified to the pixels 2a to 2f of the outer periphery of the pixels 1a to 1d, the pixels of the distance 3 is specified to the pixels 3a to 3h of the further outer periphery thereof, and the pixels of the distance 4 is specified to the pixels 4a to 4l of the further outer periphery thereof.

These are similarly voted for the co-occurrence matrix 113 in combination with the pixel of interest 110.

The above-described voting processing is performed with respect to all the pixels that constitute the cell 102, and the co-occurrence matrix for every pixel is obtained.

Figure 19D:
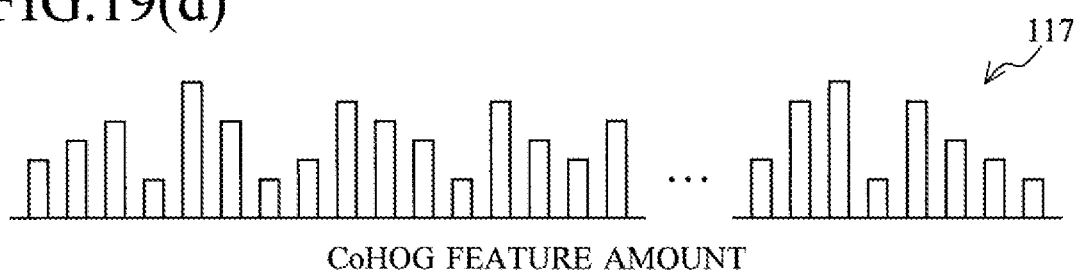

Furthermore, a histogram in which this processing is performed in all the cells 102 and all the components of the co-occurrence matrix are arranged in a line as shown in FIG. 19(d) is the CoHOG feature amount 117 of the image 101.

FIG. 20 are drawings for describing the MRCoHOG feature amount.

The MRCoHOG feature amount significantly reduces the offset number by co-occurring between different resolutions of the same image.

Figure 20A:
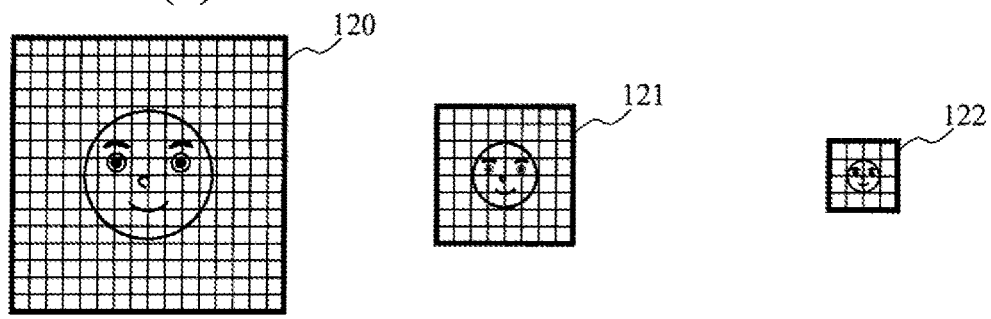
FIG. 20 are drawings for describing a concept of the MRCoHOG feature amount.

First, as shown in FIG. 20(a), a high-resolution image 120 (original image), a medium-resolution image 121, and a low-resolution image 122 are obtained by generating images having different resolutions (image sizes) from an original image. The grid in the image represents the pixel. Although not illustrated, a cell (also called a block) is set also to each of the resolution images.

Then, the luminance gradient direction quantized with respect to each pixel of the high-resolution image 120, the medium-resolution image 121, and the low-resolution image 122 is calculated.

Figure 20B:
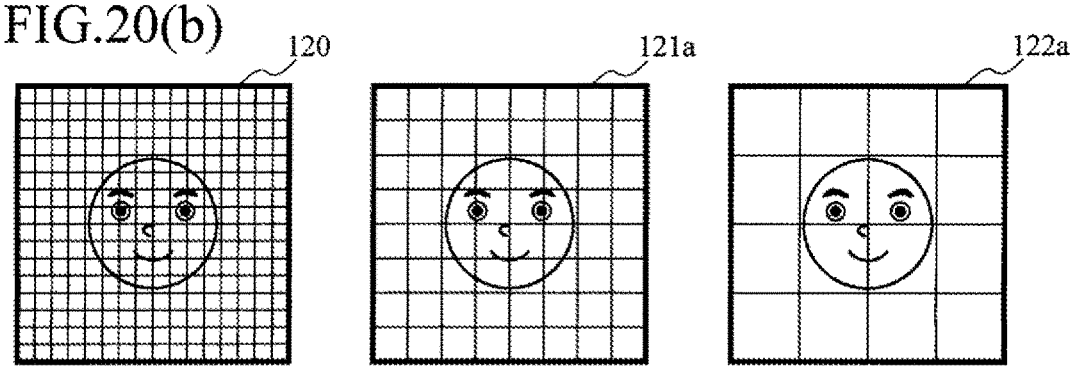

Although the medium-resolution image 121 and the low-resolution image 122 are used for extraction of the MRCoHOG feature amount, the medium-resolution image 121 and the low-resolution image 122 are extended to the medium-resolution image 121a and the low-resolution image 122a so as to have the same size as that of the high-resolution image 120, as shown in FIG. 20(b), in order to make it easy to understand.

Figure 20C:
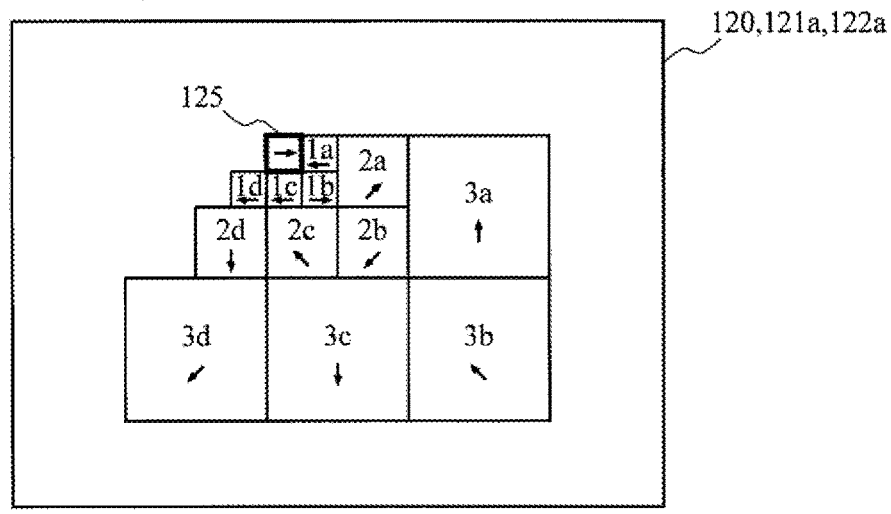

Next, as shown in FIG. 20(c), in the similar manner to the CoHOG feature amount, co-occurrence (combination of the luminance gradient directions) between the luminance gradient direction in a pixel of interest 125 of the high-resolution image 120 and the luminance gradient direction in surrounding pixels 1a to 1d of the high-resolution image 120 is taken, and a vote is cast for a co-occurrence matrix (not illustrated).

Next, a vote is cast for a co-occurrence matrix in accordance with co-occurrence between the pixel of interest 125 of the high-resolution image 120 and pixels 2a to 2d of the medium-resolution image 121a on the outer periphery of the pixels 1a to 1d, and a vote is further cast for a co-occurrence matrix in accordance with co-occurrence between the pixel of interest 125 and pixels 3a to 3d of the low-resolution image 122a on the outer periphery of the pixels 2a to 2d.

In this manner, for the pixel of interest 125 of the high-resolution image 120, the co-occurrence matrixes obtained by taking the co-occurrence with the combination in the high-resolution image 120, the combination with the medium-resolution image 121a, and the combination with the low-resolution image 122a are obtained.

This processing is performed for each pixel in the cells of the high-resolution image 120, and is further performed for all cells.

Thereby, the co-occurrence matrix for every pixel of the high-resolution image 120 is obtained.

Figure 20D:

Similarly, a co-occurrence matrix with each resolution image in the case of setting a pixel of interest to the medium-resolution image 121a and a co-occurrence matrix with each resolution image in the case of setting a pixel of interest to the low-resolution image 122a are further calculated. A histogram in which the components of all co-occurrence matrices are arranged in a line as shown in FIG. 20(d) is the MRCoHOG feature amount 127 of the high-resolution image 120.

In this example, although the histogram obtained by connecting the co-occurrence matrix in the case of setting the pixel of interest to the high-resolution image 120, the co-occurrence matrix in the case of setting the pixel of interest to the medium-resolution image 121a, and the co-occurrence matrix in the case of setting the pixel of interest to the low-resolution image 122a is used as the MRCoHOG feature amount, any one of a histogram according to a co-occurrence matrix in the case of setting a pixel of interest to the high-resolution image 120 can be used as the MRCoHOG feature amount, for example.

Alternatively, any two co-occurrence matrices may be combined, or the co-occurrence may be obtained for four or more types of resolution images by further increasing the resolutions.

Experiments conducted by the inventors have revealed that the MRCoHOG feature amount can significantly reduce the feature amount compared with the CoHOG, but the robustness is more effective than that of the CoHOG.

It is assumed that this is because a noise is reduced by lowering the resolution, and the co-occurrence with a part away from the pixel of interest is observed.

Next, an application form of the mathematical calculation formula to hardware will now be described.

In order to calculate the MRCoHOG feature amount, it is necessary to calculate the square root, division, and arc tangent.

However, since a computer performs various calculations, such as the square root etc. by addition, these operations have a large load.

Accordingly, in order to increase the calculation speed or to make a circuit scale appropriate so as to be formed into IC chip, it is necessary to design a calculation method suitable for hardware.

FIG. 21 are drawings for describing a calculation method used for the present embodiment.

As shown in FIG. 21, (a) m(x, y) in the equation (1) shown in FIG. 21 (a) indicates a calculation formula of a gradient strength of the luminance gradient of the pixel in the coordinate (x, y).

It is to be noted that, in order to prevent garbled characters, lowercase subscripts are represented by full-width characters.

fx(x, y) and fy(x, y) are respectively the gradient strengths of the luminance in the x direction (horizontal direction/lateral direction) and the y direction (vertical direction/lengthwise direction).

fx(x, y) and fy(x, y) respectively are mathematically obtained by partially differentiating the luminance in the x and y directions. However, in the present embodiment, fx(x, y) is expressed by the difference between the luminances of the pixels adjacent to each other in the horizontal direction (lateral direction) of the pixel of interest, and fy(x, y) is expressed by the difference between the luminances of the pixels adjacent to each other in the vertical direction (lengthwise direction) of the pixel of interest.

As expressed in the equation (1), although the gradient strength includes the square root, the equation (1) is approximated by the additive expression of the equation (2) by replacing Euclidean distance to Manhattan distance.

This replacement is performed by approximating the square root of the Euclidean distance between points TU (t square+u square) by t+u which is Manhattan distance, as expressed in the right diagram of FIG. 21(a). The name of Manhattan is derived from the fact that the streets of Manhattan, a U.S. city, have a grid pattern.

The gradient strength is an amount that increases as the difference between the luminance levels of the luminance gradients increases, and is used for zero offset.

Although predetermined processing of not taking co-occurrence is performed with regard to that to which the gradient strength does not reach the predetermined threshold value, for example, since the influence exerted on the image identification accuracy is small, description of the aforementioned processing is omitted in the present embodiment.

As a result of the experiment, it is confirmed that replacing the Euclidean distance by the Manhattan distance hardly affected the image recognition capability.

The equation (3) shown in FIG. 21 (b) expresses a calculation formula of the luminance gradient direction θ generally used.

Since the expression (3) includes the division of fy(x, y) by fx(x, y) and the calculation of arctangent, a processing load required for the calculation is increased.

Therefore, a present embodiment focuses attention on the fact that not the accurate value according to the equation (3) but the quantized luminance gradient direction is required for the calculation of the MRCoHOG feature amount, a correspondence table to which the set of fx(x, y) and fy(x, y) is associated with the luminance gradient direction is prepared without using the equation (3), and thereby the set of fx(x, y) and fy(x, y) is mapped in the quantized luminance gradient direction.

FIG. 21(c) shows a relationship between a range of angle θ and the quantized luminance gradient direction θ.

In the present embodiment, the luminance gradient direction is quantized in the eight directions, as an example.

In this case, as shown in FIG. 21(c), when the luminance gradient direction θ is within a range of 0°<=θ<45°, it is quantized to 0°; when the luminance gradient direction θ is within a range of 45°<=θ<90°, it is quantized to 45°; and when the luminance gradient direction θ is within other angles, it is quantized to 90°, 135°, 180°, 225°, 270°, and 315°.

First, this method classifies a combination of positive and negative of fx(x, y) and fy(x, y) into classifications a to d in accordance with the classification 11.

The classification a is a case where fx(x, y) and fy(x, y) are both positive, the classification b is a case where fx(x, y) and fy(x, y) are both negative, the classification c is a case where fy(x, y) is negative and fx(x, y) is positive, and the classification d is a case where fx(x, y) is negative and fy(x, y) is positive.

Next, the magnitude relationship between fx(x, y) and fy(x, y) is compared to be made to correspond to the quantized luminance gradient direction in accordance with the classification 12.

If y of the classification a is equal to or less than x, it corresponds to 0°, and if y of the classification a is greater than x, it corresponds to 45°.

If −y of the classification b is equal to or less than x, it corresponds to 90°, and if −y of the classification b is greater than x, it corresponds to 135°.

If y of the classification c is equal to or greater than x, it corresponds to 180°, and if y of the classification c is less than x, it corresponds to 225°.

If −y of the classification d is equal to or greater than x, it corresponds to 270°, and if −y of the classification d is less than x, it corresponds to 315°.

As described above, in the present embodiment, the luminance gradient direction quantized at high speed can be obtained by referring the correspondence table configured by the classifications 11 and 12, without using an arc tangent or division.

Thus, the image processing device of the present embodiment acquires the luminance gradient intensity fx(x, y) in the horizontal direction and the luminance gradient intensity fy(x, y) in the vertical direction of the pixel of interest using the luminance of the pixels adjacent to the pixel of interest, and outputs the quantized gradient direction by referring the acquired luminance gradient intensity in the horizontal direction and the acquired luminance gradient intensity in the vertical direction with the correspondence table to which the positive/negative relationship and the magnitude relationship between the luminance gradient intensity in the horizontal direction and the luminance gradient intensity in the vertical direction are associated with the quantized gradient direction.

Figure 22:
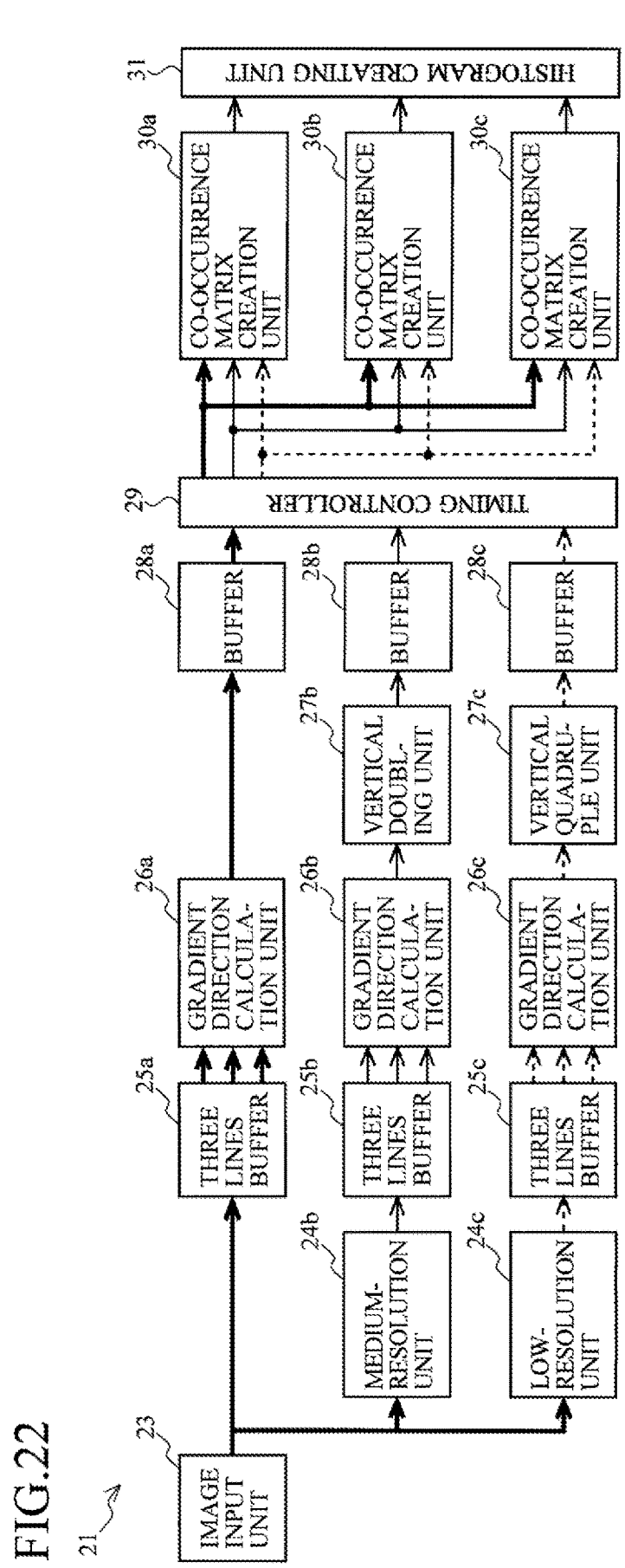
FIG. 22 is a drawing showing a circuit configuration of an image processing device.

FIG. 22 is a drawing showing a circuit configuration of the image processing device of the present embodiment.

The image processing device 21 is formed, as a semiconductor device, on a semiconductor chip, for example.

The image processing device 21 includes: a high-resolution image processing line composed from a three lines buffer 25a to a buffer 28a; a medium-resolution image processing line composed from a medium-resolution unit 24b to a buffer 28b; and a low-resolution image processing line composed from a low-resolution unit 24c to a buffer 28c.

Since these pipelines are arranged in parallel and simultaneously perform parallel processing of high-resolution image, medium-resolution image, and low-resolution image, thereby high-speed processing can be realized.

Here, the circuit composed of a combination of the high-resolution image processing line, the medium-resolution image processing line, and the low-resolution image processing line is functioned, using the luminance sequentially output, as a gradient direction output means for sequentially outputting the gradient direction of the luminance of each pixel in a plurality of resolutions in parallel to for every resolution.

Moreover, the high-resolution image processing line, the medium-resolution image processing line, and the low-resolution image processing line are arranged in parallel for each of the plurality of resolutions, and is functioned as a plurality of gradient direction output means for each resolution for outputting the gradient direction of the luminance in the pixel of the aforementioned resolution from the luminance sequentially outputted from the below-described image input unit 23.

The image processing device 21 can sequentially output the gradient direction for each resolution in parallel by simultaneously operating these gradient direction output means for each resolution, in synchronization with a clock.

Hereinafter, each circuit which constitutes the image processing device 21 will now be described.

In order to calculate the MRCoHOG feature amount, it is only necessary to have luminance data of each pixel constituting the image.

Accordingly, in the present embodiment, Y (luminance) of the pixel is extracted from an image formed in the YUYV format and is input into the image processing device 21 as luminance data.

Hereinafter, the luminance data of the pixel on the i-th row and the j-th column of the image and gradient direction data described later are represented by the row number and the column number (e.g., (i-j)) of the corresponding pixel.

The image input unit 23 is a circuit configured to sequentially output luminance data of an image of a frame transmitted from a moving image camera on the basis of a pixel order (order that the aforementioned pixels are arranged in the image), and is functioned as a luminance output means for sequentially outputting the luminance of the pixel which constitutes the image on the basis of the order of the aforementioned pixels.

It is to be noted that although the luminance data Y is extracted in advance from the image in YUYV format and is input into the image input unit 23 as an image, in the present embodiment, it may be configured so that a luminance component may be extracted from pixel data by the image input unit 23 or by the gradient direction calculation units 26a, 26b, and 26c.

Figure 24A:
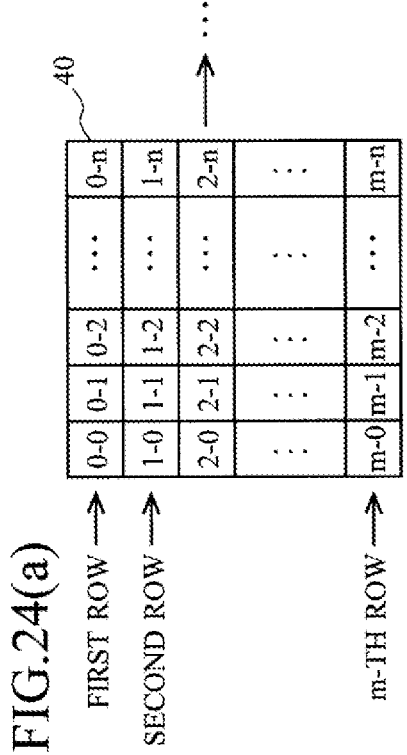

As shown in FIG. 24(a), the image 40 is composed of the luminance data (0-0), (0-1), (0-2), ..., (0-n) in the first row, luminance data (1-0), (1-1), (1-2), ..., ..., (1-n) in the second row, and luminance data (m-0), (m-1), (m-2), ..., (m-n) in the m-th row.

The image input unit 23 reads the luminance data from the image 40 sent from the image input unit in order from the upper row to the right, and outputs the luminance data (0-0), (0-1), (0-2), ..., (0-n), (1-0), (1-1), ....

Returning to FIG. 22, the output lines of the image input unit 23 are wired to the three lines buffer 25a, the medium-resolution unit 24b, and the low-resolution unit 24c, and the luminance data output from the image input unit 23 is simultaneously output to each of the three lines buffer 25a, the medium-resolution unit 24b, and the low-resolution unit 24c.

FIG. 22 represents the wiring of the high-resolution luminance data by the thick arrow, represents the wiring of the medium-resolution luminance data by the thin arrow, and represents the wiring of the low-resolution luminance data by the dotted line.

The medium-resolution unit 24b and the low-resolution unit 24c respectively are resolution conversion circuits configured to convert the resolution (size) of the image 40 into a half and a quarter.

These resolution conversion circuits respectively generate an image having a half of the resolution and an images having a quarter of the resolution, from the image 40.

The image 40 is directly used also as the high-resolution image, without converting the resolution.

The methods of converting (resizing) the resolution include nearest neighbor interpolation, bilinear interpolation, and bicubic interpolation.

The nearest neighbor interpolation is a method of extracting pixels before resizing to be directly used. The bilinear interpolation is a method of weighting and averaging a 2×2 region centering on the object pixel. The bicubic interpolation is a method of interpolating a 4×4 region centering on the object pixel with a cubic function.

In the image processing device 21, the nearest neighbor interpolation, which is simple in calculation and further improves detection accuracy (described later) is adopted.

FIG. 23 are drawings for describing the resolution conversion processing performed by the medium-resolution unit 24b and the low-resolution unit 24c.

Figure 23A:
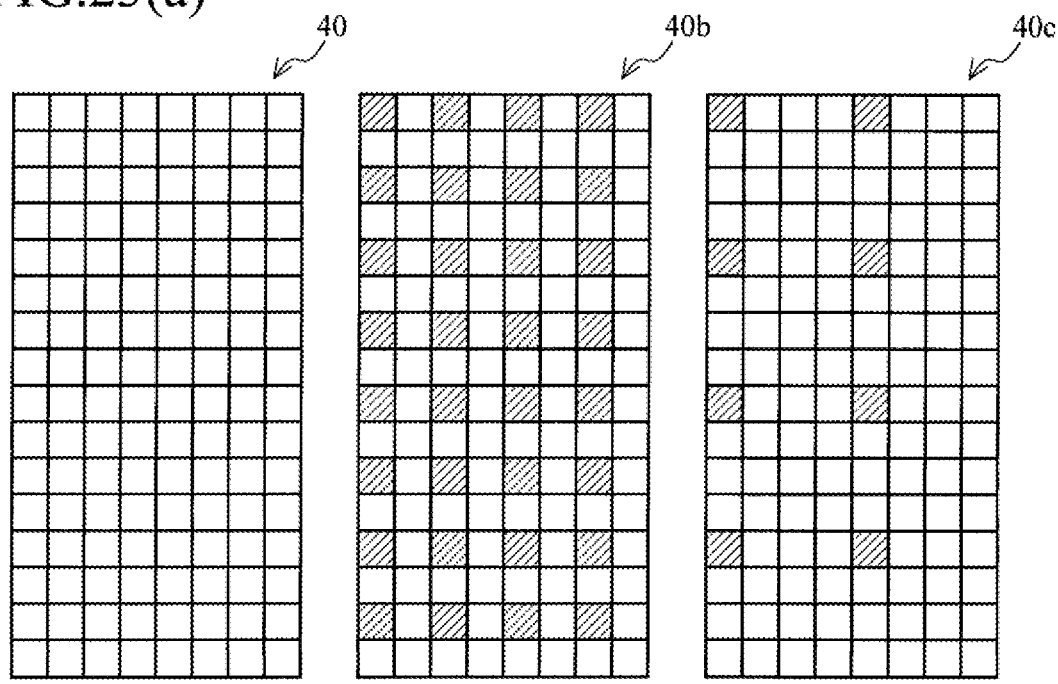
FIG. 23 are drawings for describing a resolution conversion processing.

As shown in image 40b of FIG. 23(a), the medium-resolution unit 24b reads luminance data at every second frequency (alternately) represented by the hatching among the luminance data of the image 40 transmitted from the image input unit 23, and skips the remaining luminance data, thereby generating image data having a resolution of ½, in which luminance data are arranged at every second frequency (alternately) in the vertical direction and the horizontal direction.

As shown in image 40c, the low-resolution unit 24c reads luminance data at every third frequency represented by the hatching among the luminance data of the image 40 transmitted from the image input unit 23, and skips the remaining luminance data, thereby generating image data having a resolution of ¼, in which luminance data are arranged at every third frequency in the vertical direction and the horizontal direction.

By culling out the luminance data in this manner, the medium-resolution unit 24b generates and outputs the medium-resolution image of which the resolution is one half, and the low-resolution unit 24c generates and outputs the low-resolution image of which the resolution is one fourth.

Since the nearest neighbor interpolation is adopted thereinto, the resolution can be changed by simple processing with a small calculation load of skipping unnecessary data and picking up necessary data.

As described above, the image processing device 21 sequentially outputs the luminance of the aforementioned resolution by selecting from a luminance output means (image input unit 23) the luminance sequentially output with the frequency based on the aforementioned resolution.

In more detail, the high-resolution image processing line (from the three lines buffer 25a to the buffer 28a) select and output (the luminance of) the pixels according to the frequency (every time since all the luminance are selected) based on the high resolution. In the medium-resolution image processing line (from the medium-resolution unit 24b to the buffer 28b), the medium-resolution unit 24b selects and outputs (the luminance of) the pixels according to the frequency (at every second frequency) based on the medium resolution. In the low-resolution image processing line (from the low-resolution unit 24c to the buffer 28c), the low-resolution unit 24c selects and outputs (the luminance of) the pixels according to the frequency (at every fourth frequency) based on the low resolution.

These processing lines output the gradient direction in each resolution using the luminance data.

Figure 23B:
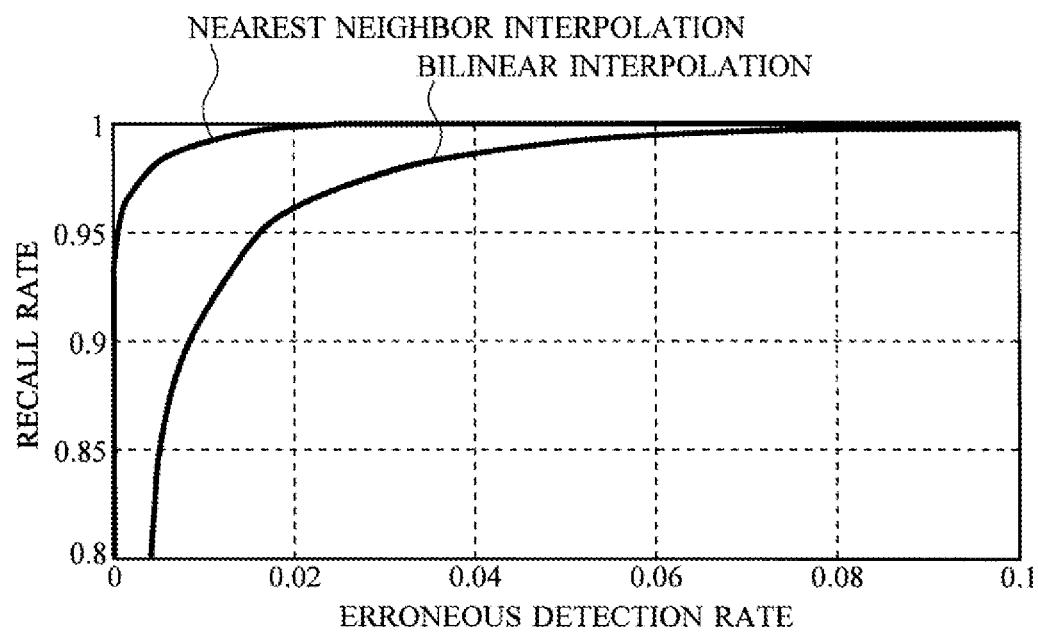

FIG. 23(b) is a Receiver Operating Characteristic (ROC) curve diagram showing experimental results of an identification rate in the case of using the nearest neighbor interpolation and an identification rate in the case of using the bilinear interpolation.

The vertical axis and the horizontal axis are respectively a recall rate and an erroneous detection rate, and indicate that the larger the area under the curve, the larger the identification rate.

As shown in the drawing, the identification rate in the case of using the nearest neighbor interpolation shows overwhelmingly effective performance more than the identification rate in the case of using the bilinear interpolation. This is probably because the nearest neighbor interpolation has sharper edges than the bilinear interpolation, and thus the accuracy has improved.

Thus, the nearest neighbor interpolation is suitable for hardware implementation since it is simple to process and also greatly improves the identification rate.

Returning to FIG. 22, the three lines buffer 25a is a circuit configured to store the luminance data of the high-resolution image, and to outputs the stored luminance data arranges for three rows in parallel to the gradient direction calculation unit 26a.

The gradient direction calculation unit 26a is a circuit configured to output gradient direction data indicating the luminance gradient direction of the pixel of interest in the high-resolution image using the luminance data for three rows.

The three lines buffer 25b is a circuit configured to store the luminance data of the medium-resolution image, and to outputs the stored luminance data arranges for three rows in parallel to the gradient direction calculation unit 26b.

The gradient direction calculation unit 26b is a circuit configured to output gradient direction data indicating the luminance gradient direction of the pixel of interest in the medium-resolution image using the luminance data for three rows.

The three lines buffer 25c is a circuit configured to store the luminance data of the low-resolution image, and to outputs the stored luminance data arranges for three rows in parallel to the gradient direction calculation unit 26c.

The gradient direction calculation unit 26c is a circuit configured to output gradient direction data indicating the luminance gradient direction of the pixel of interest in the low-resolution image using the luminance data for three rows.

FIG. 24 are drawings for describing a detailed operation of the three lines buffer 25a and the gradient direction calculation unit 26a.

As previously described with reference to FIG. 24(a), the luminance data of image 40 of the high-resolution image is output as (0-0), (0-1), . . . , from the image input unit 23.

Figure 24B:
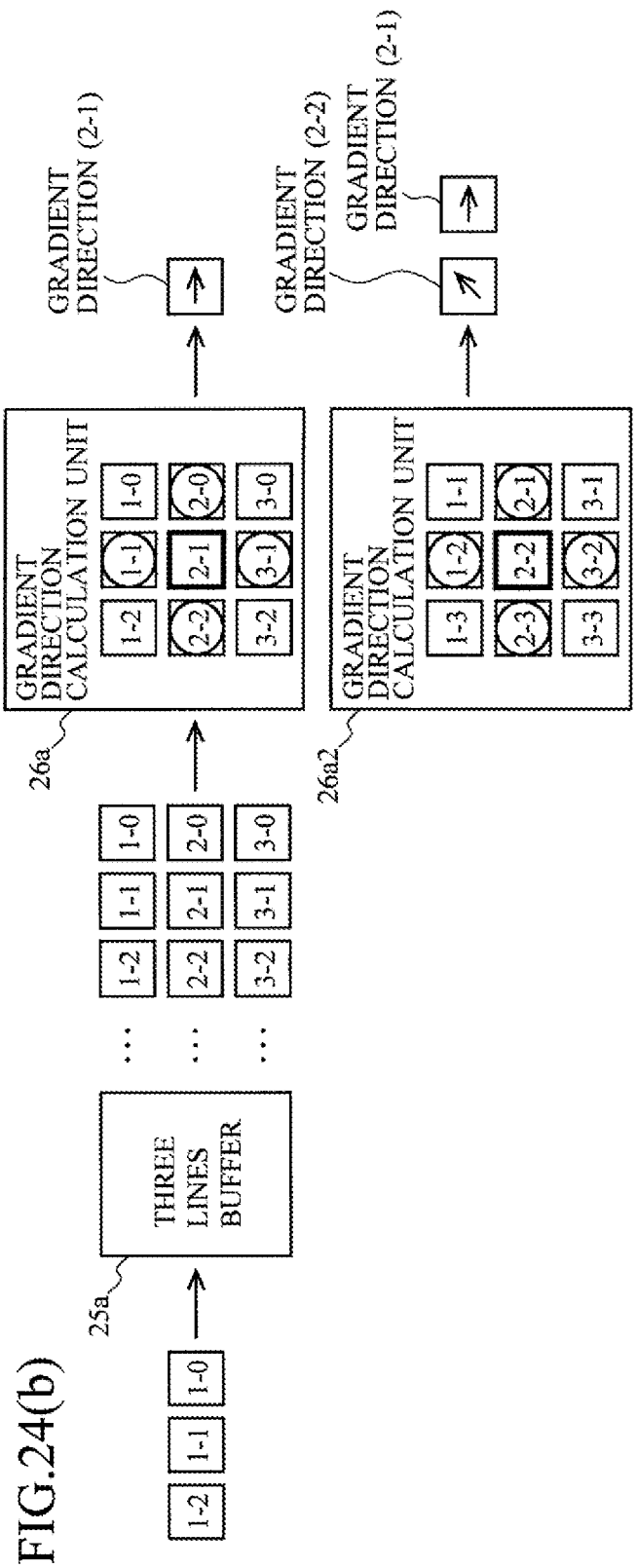

As shown in FIG. 24(b), the three lines buffer 25a stores the luminance data for three rows for each row, outputs the three rows of data in parallel to the gradient direction calculation unit 26a.

In the example of FIG. 24(b), the luminance data (1-0), (1-1), (1-2), . . . of the second line of the image 40, the luminance data (2-0), (2-1), (2-2), . . . of the third line thereof, and the luminance data (3-0), (3-1), (3-2), . . . of the fourth line thereof are output in parallel to the gradient direction calculation unit 26a so as to align the pixel columns.

The gradient direction calculation unit 26a receives the input of three rows of luminance data which is output in parallel, and outputs quantized luminance gradient direction.

As shown in the drawing, the gradient direction calculation unit 26a includes an array of storage elements of three rows and three columns, and acquires luminance data of three rows and three columns in synchronization with the output of the three lines buffer 25a to read the luminance based on the luminance data.

As shown in the drawing, the gradient direction calculation unit 26 sets centered luminance data as the pixel of interest among the luminance data of three rows and three columns. In the example shown in the drawing, the luminance data (2-1) enclosed with the bold rectangle is the luminance data of the pixel of interest.

Then, the gradient direction calculation unit 26a calculates luminance gradient intensity fx(x, y) in the horizontal direction from the luminance difference between the luminance data (2-2) and the luminance data (2-0) adjacent to the pixel of interest in the horizontal direction, and calculates luminance gradient intensity fy(x, y) in the vertical direction from the luminance difference between the luminance data (1-1) and the luminance data (3-1) adjacent to the pixel of interest in the vertical direction.

The gradient direction calculation unit 26a calculates m(x, y) by substituting the obtained fx(x, y) and fy(x, y) into the equation (2) shown in FIG. 21, and performs predetermined processing if the calculated m(x, y) is not reached at a threshold value.

If m(x, y) is reached at the threshold value, the gradient direction data (2-1) representing the quantized luminance gradient direction of the aforementioned pixel is output with reference to fx(x, y) and fy(x, y) with the correspondence table.

As described above, the gradient direction data is generated corresponding to the pixel similarly to the luminance data.

In the next clock, the column of the luminance data moves by one, and the next luminance data (2-2) becomes the pixel of interest, and the gradient direction data (2-2) is output, as shown in the gradient direction calculation unit 26a2.

As described above, the gradient direction calculation unit 26a sequentially outputs the gradient direction data for every clock.

When reaching the last column, the gradient direction calculation unit 26a proceed the row by one, and outputs the gradient direction data using the luminance data of the next row as a pixel of interest.

Similarly, the three lines buffer 25b and the gradient direction calculation unit 26b output gradient direction data of the medium-resolution image, and the three lines buffer 25c and the gradient direction calculation unit 26c output gradient direction data of the low-resolution image.

Thus, the position of a pixel of interest and the position of the adjacent pixels adjacent thereto are associated with the array of the storage elements of three rows and three columns arranged in the gradient direction calculation unit 26a, and the luminance data of the pixel of interest and the luminance data of the adjacent pixels are sequentially specified using the correspondence of the positions, in the luminance data sequentially transmitted in accordance with the clock.

The order of passing through the position of the pixel of interest and the position of the adjacent pixels is determined by the order to which the image input unit 23 outputs the luminance data.

This configuration is logically the same as a configuration in which the luminance data of the pixel of interest and the luminance data of the adjacent pixels are specified by observing a window for the pixel of interest and a window for the adjacent pixels provided on a path of the luminance data sequentially transmitted in a bucket brigade manner.

In image processing device 21, since the processing of the edge and the circuit configuration are simplified, the luminance data is buffered for three rows and sequentially sent to the array of three rows and three columns, but this is merely an example. Various modification for specifying the luminance data of the pixel of interest and the adjacent pixels based on the order output by the image input unit 23 can be adopted.

Similarly, the gradient direction calculation units 26b and 26c respectively specify the luminance data of the pixel of interest and the adjacent pixels based on the order in which the medium-resolution unit 24b and the low-resolution unit 24c performed downsampling of the image 40 to output the luminance data.

Thus, the gradient direction output means for each resolution specifies the luminance of the adjacent pixels adjacent in the horizontal direction and the vertical direction of the pixel of interest based on the output order of the luminance of the aforementioned resolution, and outputs the gradient direction of the pixel of interest using the luminance of the specified aforementioned adjacent pixels.

Moreover, the gradient direction output means for each resolution specifies the luminance of the adjacent pixels by arranging the luminance in the array in which the positions of the adjacent pixels are associated with each other based on the output order of the luminance of the resolution.

The array is composed by three arrays consisting of a pixel row belonging to the pixel of interest and two vertical adjacent pixel rows. The gradient direction output means for each resolution arranges the luminances of the three pixel rows in three corresponding arrays and specifies the luminance of the adjacent pixels on the basis of the position where the luminance is arranged.

Returning to FIG. 22, a vertical doubling unit 27b and a vertical quadruple unit 27c are respectively circuits configured to extend the gradient direction data for vertical direction twice (2× magnification) and four times (4× magnification) with regard to the vertical direction for the medium resolution image and the low resolution image.

This processing is for adjusting the timing at the time of reading later the co-occurrence by the co-occurrence-matrix creation unit 30a or the like.

FIG. 25 is a drawing for describing data extension processing in a vertical direction.

The data 51 shows a configuration of the gradient direction data before data extension. Each grid shows each gradient direction data, and the gradient direction data is arranged in order of the corresponding pixels.

When each row of the data 51 is duplicated to be arranged adjacent to the original row, the data 52 expanded twice in the vertical direction and the data 53 expanded four times are obtained.

According to this method, the vertical doubling unit 27b duplicates the gradient direction data of the medium-resolution image output from the gradient direction calculation unit 26b for every row, and extends the duplicated data twice in the lengthwise direction (vertical direction).

Moreover, the vertical quadruple unit 27c duplicates the gradient direction data of the low-resolution image output from the gradient direction calculation unit 26c for each row and extends the duplicated data by four times in the lengthwise direction.

Returning to FIG. 22, the buffers 28a, 28b, and 28c are respectively buffers configured to temporarily store the gradient direction data of the high-resolution image, the gradient direction data of the medium-resolution image, and the gradient direction data of the low-resolution image output respectively from the gradient direction calculation unit 26a, the vertical doubling unit 27b, and the vertical quadruple unit 27c.

A timing controller 29 is a control circuit configured to control the timing of sending out the gradient direction data of the high-resolution image, the medium-resolution image, and the low-resolution image to the co-occurrence-matrix creation units 30a, 30b, and 30c.

The timing controller 29 waits until the gradient direction data of each of the resolution images is ready in the buffers 28a, 28b, and 28c, and outputs the gradient direction data when all the gradient direction data is ready.

Thereby, the output timing for every resolution image which has deviated by resolution change can be aligned.

The gradient direction data of the high-resolution image is output from the wiring shown by the thick line of the drawing, the gradient direction data of the medium-resolution image is output from the wiring shown by the thin line of the drawing, and the gradient direction data of the low-resolution image is output from the wiring shown by the dotted line of the drawing. Thus, the gradient direction data of each of the resolution images respectively is output from different wirings.

These wirings are respectively connected with the co-occurrence-matrix creation units 30a, 30b, and 30c, and thereby the gradient direction data for each resolution image is transmitted to the co-occurrence-matrix creation units 30a, 30b, and 30c.

Furthermore, the timing controller 29 extends the gradient direction data of the medium-resolution image and the low-resolution image by twice and four times in the horizontal (lateral) direction, respectively, in order to match the timing when the co-occurrence-matrix creation units 30a, 30b, and 30c take the co-occurrence.

FIG. 26 is a drawing for describing data extension processing in a horizontal direction.

Data sequences 55, 56, and 57 respectively show the timing when the timing controller 29 outputs the gradient direction data of the high-resolution image, the medium-resolution image, and the low-resolution image.

For example, as shown in the data sequence 55, the timing controller 29 sequentially outputs the gradient direction data of the high-resolution image from the first data to the thirtieth data one by one.

On the other hand, for the gradient direction data of the medium-resolution image, as shown in the data sequence 56, the first data is output once, the second to fifteenth data is respectively output twice each, and the sixteenth data is output once, in accordance with the output timing of the high-resolution image.

Moreover, for the gradient direction data of the low-resolution image, as shown in the data sequence 57, the first data is output three times, the second to seventh data is respectively output four times each, and the eighth data is output three times, in accordance with the output timing of the high-resolution image.

It is to be noted that the reason why the numbers of outputs at the beginning and end of the data sequence 55 and the data sequence 56 respectively are not twice each and four times each is to adjust each width thereof to the same width as the data sequence 55.

Consequently, the gradient direction data of the medium-resolution image and the gradient direction data of the low-resolution image are respectively extended twice and four times in the horizontal direction.

Returning to FIG. 22, each of the co-occurrence-matrix creation units 30a, 30b, and 30c is a circuit configured to create a co-occurrence matrix by voting according to the co-occurrence using the gradient direction data output from the timing controller 29.

The co-occurrence-matrix creation units 30a, 30b, and 30c respectively create the co-occurrence matrixes in which pixels of the high-resolution image, the medium-resolution image, and the low-resolution image as a pixel of interest.

The histogram creating unit 31 is a circuit configured to create the MRCoHOG feature amount from the co-occurrence matrix output from the co-occurrence-matrix creation units 30a, 30b, and 30c.

When the image processing device 21 is formed into an IC chip, the histogram creating unit 31 may be configured as an external circuit without being included in the image processing device 21 so that the histogram creating unit 31 may be connected to the IC chip.

Thereby, it is possible to realize more flexible operation, such as selecting the co-occurrence matrixes output from the co-occurrence-matrix creation units 30a, 30b, and 30c, and general-purpose properties can be improved.

Figure 27:
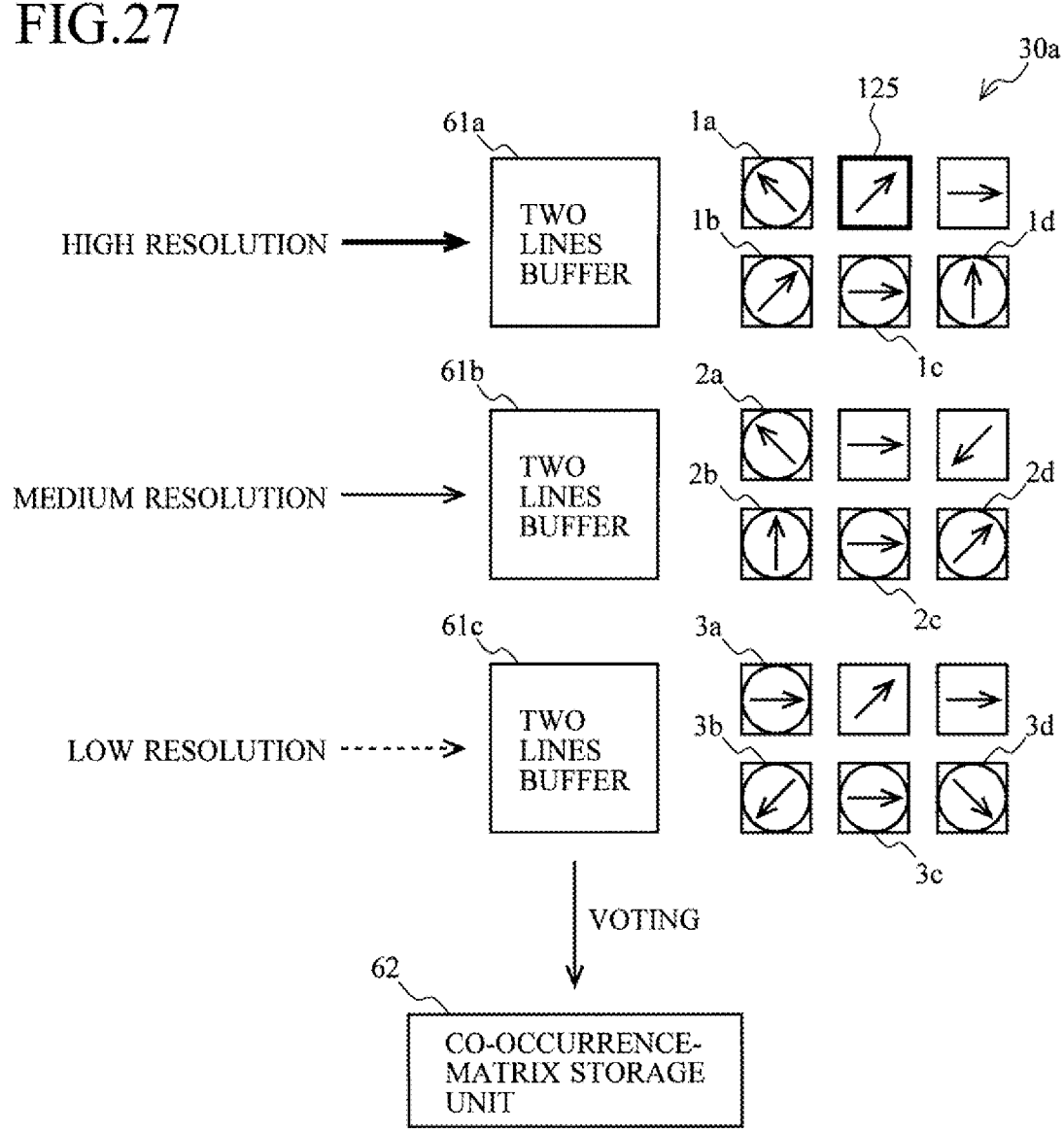
FIG. 27 is a drawing for describing a scheme for calculating a co-occurrence matrix.

FIG. 27 is a drawing for describing a scheme in which the co-occurrence-matrix creation unit 30a calculates the co-occurrence matrix.

The co-occurrence-matrix creation unit 30a includes a two lines buffer 61a for high-resolution images, a two lines buffer 61b for medium-resolution images, and a two lines buffer 61c for low-resolution images, each stores the gradient data transmitted from the timing controller 29 over two rows for each resolution.

The assignments of the gradient direction data stored in the two lines buffers 61a, 61b, and 61c is shown respectively at the right-hand side of the two lines buffers 61a, 61b, and 61c.

The reference signs indicating the positions of gradient direction data respectively corresponded to the reference signs of the positions shown in FIG. 20(c) (the gradient directions do not correspond thereto). The gradient direction data corresponding to the pixel of interest is surrounded by the bold rectangle, and the gradient direction data of the partner pixel to be combined with this gradient direction data for voting is surrounded by the white round mark.

As shown in the drawing, the gradient direction data of the high-resolution image, the gradient direction data of the medium-resolution image, and the gradient direction data of the low-resolution image for two rows and three columns are respectively arranged in the two lines buffers 61a, 61b, and 61c.

In order to arrange the data in the order of the luminance data output by the image input unit 23, the arrangement in the two lines buffers 61a, 61b, and 61c is opposite to the arrangement of FIG. 20 (c) in the left and right directions.

A co-occurrence-matrix storage unit 62 is a circuit configured to create the co-occurrence matrix for the pixel of interest 125 by receiving the voting by the co-occurrence and incrementing the frequency (number of the votes) of the co-occurrence matrix.

First, the co-occurrence-matrix creation unit 30a votes for the co-occurrence-matrix storage unit 62 on the basis of a combination of the gradient direction data of the pixel of interest 125, and the gradient direction data of the pixels 1a to 1d.

Furthermore, the co-occurrence-matrix creation unit 30a votes for the co-occurrence-matrix storage unit 62 on the basis of a combination of the gradient direction data of the pixel of interest 125, and the gradient direction data of the pixels 2a to 2d, and votes for the co-occurrence-matrix storage unit 62 on the basis of a combination of the gradient direction data of the pixel of interest 125, and the gradient direction data of the pixels 3a to 3d.

When voting of the aforementioned pixel of interest 125 is completed, the co-occurrence-matrix creation unit 30a outputs it to the histogram creating unit 31, resets the number of the votes of the co-occurrence matrix to 0, and advances one column of the gradient direction data stored in the two lines buffers 61a, 61b, and 61c.

Consequently, the co-occurrence-matrix creation unit 30a arranges the gradient direction data corresponding to the pixel 1a in the position of the pixel of interest 125, and performs voting using this for the co-occurrence-matrix storage unit 62.

By repeating the above-described operation, the co-occurrence-matrix creation unit 30a completes the co-occurrence matrix for each pixel of the high-resolution image in the co-occurrence-matrix storage unit 62, and outputs the completed co-occurrence matrix to the histogram creating unit 31.

The output histogram based on the co-occurrence matrix is coupled to the histogram creating unit 31, and becomes a MRCoHOG feature amount when the pixel of the high-resolution image is made as the pixel of interest.

Returning to FIG. 22, similarly to the co-occurrence-matrix creation unit 30a, the co-occurrence-matrix creation units 30b and 30c also respectively output the co-occurrence matrix when the pixel of the medium-resolution image is made as the pixel of interest and the co-occurrence matrix when the pixel of the low-resolution image is made as the pixel of interest.

Consequently, the MRCoHOG feature amount when the pixel of the medium-resolution image is made as the pixel of interest and the MRCoHOG feature amount when the pixel of the low-resolution image is made as the pixel of interest are obtained, and the histogram creating unit 31 couples the three MRCoHOG feature amounts of the high, middle, and low images to one another to complete the MRCoHOG feature amounts.

The image processing device 21 is configured as described above, and each circuit simultaneously operates in synchronization with the clock to sequentially perform operation in an assembly-line method.

In this manner, the image output from the moving image camera can be processed in real time.

As described above, by sequentially combining the gradient direction for each resolution to be sequentially output, the co-occurrence-matrix creation units 30a, 30b, and 30c are functioned as a co-occurrence-matrix creation means for creating the co-occurrence matrix based on the co-occurrence of the gradient direction between different resolutions, and also a co-occurrence-matrix output means for outputting the created aforementioned co-occurrence matrix as image feature amount of the aforementioned image.

Moreover, the co-occurrence matrix creation units 30a, 30b, and 30c respectively arrange the gradient direction data in the two lines buffers 61a, 61b, and 61c in the order in which the gradient direction data is output, and thereby, in order to specify the combination for taking the co-occurrence, sequentially specify the gradient direction of the pixel of interest, and the gradient direction of the pixels to be combined with the aforementioned pixel of interest on the basis of the output order for each resolution of the gradient direction to be sequentially output from the gradient direction output means, and create the co-occurrence matrix by sequentially voting for the co-occurrence matrix on the basis of the combination of the specified aforementioned gradient directions.

Moreover, since the two lines buffers 61a, 61b, and 61c are functioned as the array for specifying the gradient direction data to be the object of the co-occurrence, the co-occurrence matrix creation units 30a, 30b, and 30c arrange the gradient direction for each resolution based on the output order for each resolution in the array in which the pixel of interest and the position of the pixel to be combined with the aforementioned pixel of interest are associated to be provided (divided) for each resolution, and thereby, the gradient direction to be combined as the object of the co-occurrence is specified.

Moreover, the aforementioned array is composed of six arrays corresponding to two pixel rows adjacent to in the vertical direction with regard to each resolution (total of six, two buffers for high-resolution images, two buffers for medium-resolution images, and two buffers for low-resolution images), and each of the co-occurrence matrix creation units 30a, 30b, and 30c arranges the gradient direction of the two pixel rows of each resolution in two corresponding arrays, and specifies the gradient direction to be combined on the basis of the position where the gradient direction is arranged.

Figure 28:
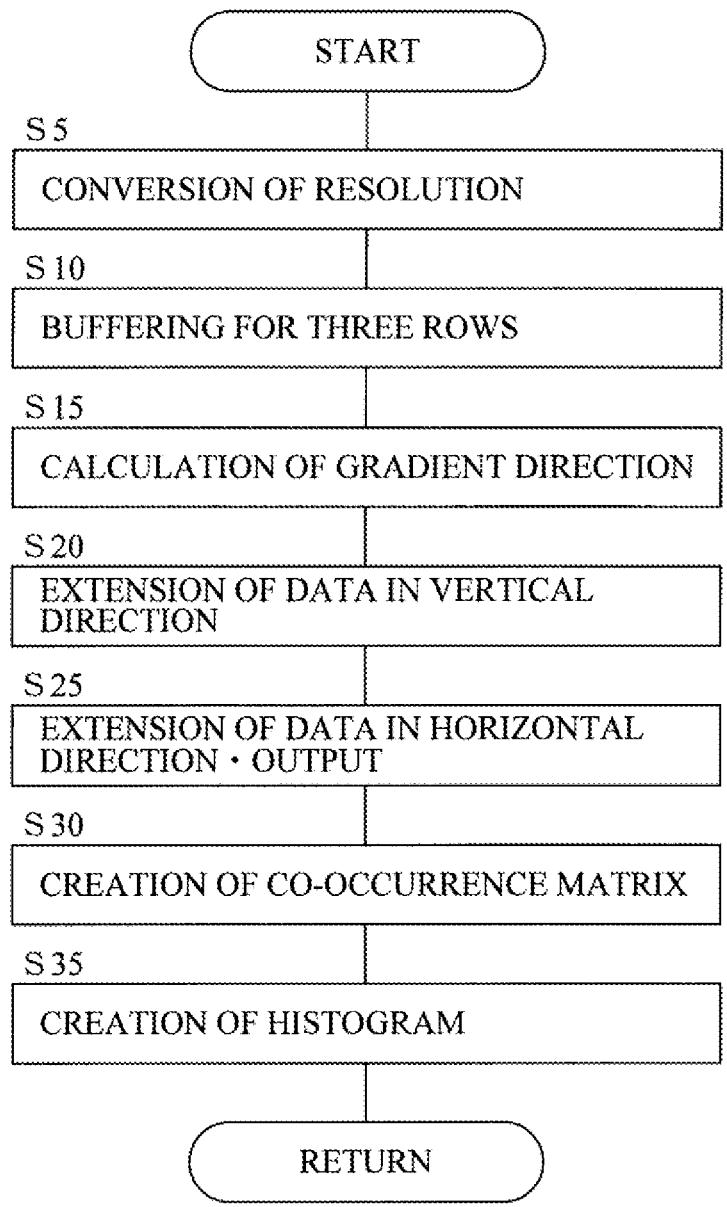
FIG. 28 is a flow chart for describing an image processing procedure.

FIG. 28 is a flow chart for describing an image processing procedure performed by the image processing device 21.

First, the image input unit 23 outputs luminance data of the image 40, and the medium-resolution unit 24b and the low-resolution unit 24c respectively output luminance data of which the resolutions are converted into the medium resolution and the low resolution (Step 5).

Moreover, the three lines buffers 25a, 25b, and 25c respectively buffer the luminance data of the high-resolution image, the medium-resolution image, and the low-resolution image for three rows (Step 10).

Moreover, the gradient direction calculation units 26a, 26b, and 26c respectively calculate the gradient directions of the pixels of the high-resolution image, the medium-resolution image, and the low-resolution image to output the gradient direction data (Step 15).

The processings of Steps 5, 10, and 15 are simultaneously performed in parallel.

Next, the vertical doubling unit 27b and the vertical quadruple unit 27c respectively extend the gradient direction data of the medium-resolution image and the low-resolution image twice and four times in the vertical direction (Step 20).

The gradient direction data of the high-resolution image, the gradient direction data of the medium-resolution image extended vertical twice, and the gradient direction data of the low-resolution image extended vertical for times are respectively buffered in the buffers 28a, 28b, and 28c.

Next, the timing controller 29 outputs the gradient direction data of each resolution at the same timing.

At this time, the timing controller 29 respectively extends and outputs the gradient direction data of the medium-resolution image and the low-resolution image twice and four times in the horizontal direction (Step 25).

The co-occurrence matrix creation units 30a, 30b, and 30c calculate the element of a co-occurrence matrix using the gradient direction data of each resolution output from the timing controller 29, and create the co-occurrence matrix (Step 30).

Furthermore, the histogram creating unit 31 creates a histogram from the created co-occurrence matrix, and outputs the created histogram as a MRCoHOG feature amount (Step 35).

As described above, the operation of each circuit has been described individually. However, each circuit simultaneously operates in synchronization with the clock, and simultaneously performs a flow operation in which data flowing from the left is sequentially (successively) processed and flown to the right.

Figure 29:
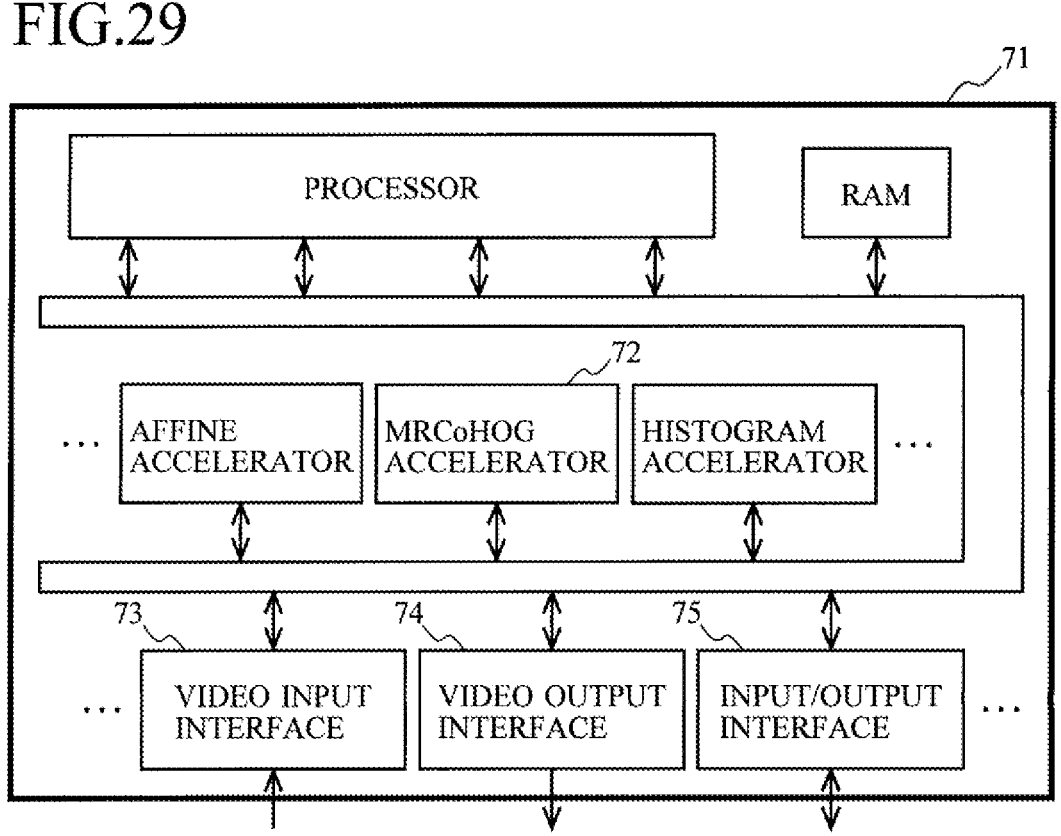
FIG. 29 is a drawing showing a configuration example of a semiconductor device.

FIG. 29 is a drawing showing an example of constituting a semiconductor device using the image processing device 21.

The semiconductor device 71 is composed of an IC chip, for example, and internally includes a processor, a RAM, a MRCoHOG accelerator 72, an affine accelerator, a histogram accelerator, a video input interface 73, a video output interface 74, an input/output interface 75, and the like.

The MRCoHOG accelerator 72 incorporates the circuit configuration of the image processing device 21 and is configured to generate and output a co-occurrence matrix from an image. Alternatively, the MRCoHOG accelerator 72 may be configured to create the histogram and extract the MRCoHOG feature amount.

The semiconductor device 71 receives an input of moving image data from the video input interface 73, extracts the MRCoHOG feature amount of each frame image by means of the MRCoHOG accelerator 72 or the like, and can recognize the object image by the processor using this MRCoHOG feature amount.

Alternatively, the moving image data may be output from the video output interface 74 and the MRCoHOG feature amount may be output from the input/output interface 75, and an external apparatus may recognize the object image.

REFERENCE SIGNS LIST 1a to 4l Pixel
11, 12 Classification
21 Image processing device
21 Image input unit 24b Medium-resolution unit
24c Low-resolution unit
25a, 25b, 25c Three lines buffer
26a, 26b, 26c Gradient direction calculation unit
27b Vertical doubling unit
27c Vertical quadruple unit
28a, 28b, 28c Buffer
29 Timing controller
30a, 30b, 30c Co-occurrence matrix creation unit
31 Histogram creating unit
40 Image
51, 52, 53 Data
55, 56, 57 Data sequence
61a, 61b, 61c Two lines buffer
62 Co-occurrence-matrix storage unit
71 Semiconductor device
72 MRCoHOG accelerator
73 Video input interface
74 Video output interface
75 Input/output interface
80 Computer
81 CPU
82 ROM
83 RAM
84 Camera
85 Storage device
86 Video capture board
87 Input device
88 Output device
101 Image
102 Cell
106 Histogram
107 HOG feature amount
109a, 109b, 109c Vector
110 Pixel of interest
113 Co-occurrence matrix
117 CoHOG feature amount
120 High-resolution image
121 Medium-resolution image
122 Low-resolution image
125 Pixel of interest
127 MRCoHOG feature amount
200 Image recognition device
201 Identification device
210 BNN
211 Input unit
213 Intermediate unit
215 Output unit
220, 221 Portion
225, 226 Equation
230 Selection unit
231 Identification unit
233 Before-selection feature amount
234 After-selection feature amount
240 Duplication unit
243 Before-duplication feature amount
244 After-duplication feature amount

The invention claimed is:

1. An information processing device comprising:
a feature amount acquiring means configured to acquire a feature amount of identification object data;
a selection means configured to select a feature amount of a portion specified in advance from the feature amount acquired by the feature amount acquiring means;
an identification means including a binary neural network that has: (i) an input layer composed of multiple input units, (ii) an intermediate layer, and (iii) an output layer configured to learn an identification object based on multiple-value weighting in the binary neural network;
an input means configured to input each feature amount of the portion selected by the selection means into all of the input units of the binary neural network; and
an output means configured to output an identification result identified by the identification means based on the feature amount of the portion input by the input means.

2. The information processing device according to claim 1, wherein in the identification means, the learning of the identification object is conducted by binarized weighting.

3. The information processing device according to claim 1, wherein
the selection means selects a feature amount of a portion specified by an identification algorithm, in advance, from the feature amount acquired by the feature amount acquiring means, and
the identification algorithm is Real AdaBoost (RAdB).

4. The information processing device according to claim 3, wherein
the selection means selects a feature amount of a portion, in which identification accuracy by the identification means becomes high, specified by the identification algorithm in advance, from the feature amount acquired by the feature amount acquiring means.

5. The information processing device according to claim 3, wherein
the feature amount acquiring means acquires a feature amount based on distribution of co-occurrence of a luminance gradient extracted by a feature amount extraction means from the image data which is identification object data, and
the selection means selects a feature amount of a portion in which extraction processing or an extraction circuit configuration by the feature amount extraction means is simplified, specified by the identification algorithm in advance, from the feature amount acquired by the feature amount acquiring means.

6. The information processing device according to claim 1, wherein the binary neural network includes: (a) an adder configured to binarize and add the feature amount of the portion, and (b) a counter configured to calculate an output of the adder.

7. An information processing device comprising:
a feature amount acquiring means configured to acquire a feature amount of identification object data by extracting a luminance gradient distribution of the identification object data;
a selection means configured to select a feature amount of a portion specified in advance from the feature amount acquired by the feature amount acquiring means;
a duplication means configured to duplicate the feature amount of the portion selected by the selection means;
an identification means configured to have learned an identification object based on multiple-valued weighting in a binary neural network;
an input means configured to input the feature amount of the portion selected by the selection means and the feature amount duplicated by the duplication means into the binary neural network; and
an output means configured to output an identification result of being identified by the identification means based on the feature amount of the portion input by the input means.

8. An information processing device comprising:
a processor programmed to:
- acquire a feature amount of identification object data;
- select a feature amount of a portion specified in advance from the acquired feature amount;
- learn an identification object based on multiple-value weighting in a binary neural network, the binary neural network including: (i) an input layer composed of multiple input units, (ii) an intermediate layer, and (iii) an output layer;
- input each feature amount of the selected portion into all of the input units of the binary neural network; and
- output an identification result of the binary neural network based on the inputted feature amount of the selected portion.

9. The information processing device according to claim 8, wherein the learning of the identification object is conducted via binarized weighting.

10. The information processing device according to claim 8, wherein
the feature amount of the portion is selected via an identification algorithm, in advance, from the acquired feature amount, and
the identification algorithm is Real AdaBoost (RAdB).

11. The information processing device according to claim 10, wherein
when an identification accuracy of the identification algorithm is greater than a predetermined amount for a current feature amount of the portion from the acquired feature amount, the identification algorithm selects the current feature amount as the selected feature amount of the portion.

12. The information processing device according to claim 10, wherein
the feature amount is acquired based on a distribution of co-occurrence of a luminance gradient extracted from the image data that is in the identification object data, and
the feature amount of portion is selected based on extraction processing or an extraction circuit configuration from the acquired feature amount.

13. The information processing device according to claim 8, wherein the binary neural network includes: (a) an adder configured to binarize and add the feature amount of the portion, and (b) a counter configured to calculate an output of the adder.

* * * * *